(12) United States Patent
Considine et al.

(10) Patent No.: US 7,308,818 B2
(45) Date of Patent: Dec. 18, 2007

(54) IMPACT-SENSING AND MEASUREMENT SYSTEMS, METHODS FOR USING SAME, AND RELATED BUSINESS METHODS

(75) Inventors: Gary Considine, Woodland Hills, CA (US); Jeff Dankworth, Reno, NV (US); Rita Server, Woodland Hills, CA (US); Ian Lerner, La Jolla, CA (US); Roswell R. Roberts, III, San Diego, CA (US)

(73) Assignee: Garri Productions, Inc., Woodland Hills, CA (US)

( * ) Notice: Subject to any disclaimer, the term of this patent is extended or adjusted under 35 U.S.C. 154(b) by 83 days.

(21) Appl. No.: 11/055,780

(22) Filed: Feb. 9, 2005

(65) Prior Publication Data

US 2005/0266967 A1 Dec. 1, 2005

Related U.S. Application Data

(60) Provisional application No. 60/542,342, filed on Feb. 9, 2004, provisional application No. 60/601,996, filed on Aug. 17, 2004.

(51) Int. Cl.
*G01M 7/00* (2006.01)
*G01N 3/00* (2006.01)
*G01N 33/00* (2006.01)
*G01P 15/00* (2006.01)

(52) U.S. Cl. .................................... 73/12.09
(58) Field of Classification Search ............... 73/12.09, 73/12.01; 482/84
See application file for complete search history.

(56) References Cited

U.S. PATENT DOCUMENTS

| 4,928,959 | A | * | 5/1990 | Bassett et al. | 482/79 |
|---|---|---|---|---|---|
| 5,605,336 | A | * | 2/1997 | Gaoiran et al. | 273/445 |
| 5,723,786 | A | * | 3/1998 | Klapman | 73/379.04 |
| 5,739,811 | A | * | 4/1998 | Rosenberg et al. | 345/161 |
| 5,741,970 | A | * | 4/1998 | Rubin | 73/379.05 |
| 6,066,075 | A | * | 5/2000 | Poulton | 482/8 |
| 6,837,827 | B1 | * | 1/2005 | Lee et al. | 482/8 |
| 6,925,851 | B2 | * | 8/2005 | Reinbold et al. | 73/12.09 |
| 6,971,973 | B2 | * | 12/2005 | Cohen et al. | 482/8 |

(Continued)

OTHER PUBLICATIONS

International Search Report and Written Opinion from International Application No. PCT/US05/04526 mailed Sep. 7, 2006.

*Primary Examiner*—Michael Cygan
*Assistant Examiner*—Octavia Davis
(74) *Attorney, Agent, or Firm*—Holland & Hart

(57) ABSTRACT

Impact-sensing and measurement systems are disclosed, especially for use in contact sports and related activities that involve exchanges of impacts or blows. The system generally includes at least one impact sensor, a controller, and a feedback device. The controller is in communication with the at least one impact sensor, and includes a microprocessor having a control program software executed thereon at least for processing data from the at least one impact sensor. The feedback device is in communication with the controller and is configured to produce an audio or video output, or combined audio and visual output, based on impact data produced by the impact sensor upon sensing an impact and processed by the first controller. The controller can be programmed to provide specialized training regimens and/or interactive training programs, such as over a computer network.

42 Claims, 20 Drawing Sheets

U.S. PATENT DOCUMENTS 7,166,064 B2 * 1/2007 Watterson et al. ............ 482/54
7,189,190 B2 * 3/2007 Lamar et al. .................. 482/8
2003/0216228 A1 * 11/2003 Rast ............................ 482/84
2006/0258515 A1 * 11/2006 Kang et al. ................... 482/83

* cited by examiner

IMPACT-SENSING AND MEASUREMENT SYSTEMS, METHODS FOR USING SAME, AND RELATED BUSINESS METHODS

CROSS REFERENCE TO RELATED APPLICATION

This application claims priority from U.S. Provisional Application Nos. 60/542,342, filed Feb. 9, 2004 and 60/601,996, filed Aug. 17, 2004, both of which are expressly incorporated herein by reference in their entirety.

COPYRIGHT NOTICE

A portion of the instant disclosure is in the form of material that is subject to copyright protection. The copyright owner has no objection to the reproduction of the patent document or patent disclosure for patent review in exactly the form it appears in the U.S. Patent and Trademark Office file or records, but otherwise reserves all copyright rights whatsoever.

FIELD

This disclosure pertains to, inter alia, systems and methods for interactive sports training and analogous activities. For example, the systems are applicable to interactive athletic training such as martial arts training, football, baseball, and other sports training, in which helmets or other protective gear and other objects that receive or transmit impact forces are used.

BACKGROUND

Training for impact sports, self-defense, or combat applications such as law enforcement, and training for martial and other fighting arts, often requires that an individual perform strikes or impacts against a person or object. A number of conventional devices and methods are used to test and measure the power generated by martial or athletic impacts. These devices typically have significant shortcomings that prevent the collection of detailed, accurate data about the performance of the subject tested, and that prevent analysis of the data to the desired extent.

Applications of impact-measurement devices can be found in a number of conventional exercise and training devices. Usually, a purpose of these conventional devices is to monitor and/or direct an exercise workout or training session consisting of punches, kicks, or other simulated movements that involve impact. Measurements provided by these devices are often limited to counts of the number of impacts and simple approximations of impact power for each impact. Conventional devices do not normally provide immediate interactive feedback that would be useful for guiding the user in altering and/or refining his technique in response to the measurements as they are made. Consequently, conventional systems usually cannot provide sufficiently detailed data useful for analyzing a user's performance deficiencies in a manner that allows the user to alter his performance immediately or in real time in response to the data.

With respect to impacts delivered in martial arts and other sports, a person's ability to produce a displacement, a deformation, or a rupture in specific areas of a target is of concern. The objective of instruction and training in, for example, sports and martial arts is to enable an individual to reliably and efficiently perform strikes that produce the desired results, i.e., that produce ideal magnitudes of impact force in the proper directions. Traditionally, instructors have provided such instruction by observing the student's execution of a strike performed on an object and by observing and assessing the effects of the impact on the target. This traditional method of instruction usually precludes an ability to perform a visual observation of that portion of the strike at the brief instant in which the impact is actually occurring.

High-speed photography has been used in attempts to measure the velocities and directions of the fist, foot, shoulder, whole body, or other striking element prior to contact, as well as the displacement or deformation of the target during the impact. The magnitude and direction of the exerted force are then calculated using a best-guess estimate of the amount of target mass displaced and/or the extent of target deformation that occurs.

In these various conventional methods of testing impact forces and of assessing the results of impacts, a person (usually an instructor or physical therapist) is normally present with the person applying the impact in order to provide instruction, guidance, or feedback regarding the impacts. To date, there are no known modes by which a person can train for contact-related activity while receiving feedback (especially instantaneous feedback from both the target and a person having expertise in making optimal impacts with the target.

Efforts have conventionally been made to measure the effectiveness of an impact strike from data concerning only pre-impact momentum or from simple physical laws of motion and dynamics. However, these types of measurements tend to produce inaccurate results. A better way in which to measure forces produced during impacts is by using direct, real-time measurements of the effects of the impacts as the impacts are made on a target that is configured to provide measurements of the durations, directions, and magnitudes of the impacts. But, as noted above, known conventional devices lack this capability.

Many conventional strike-measurement devices are designed around the assumption that the force applied to a target is directly proportional to the momentum of the striking element (e.g., hand or foot) immediately preceding the impact with the target. However, the magnitude of the momentum (wherein momentum is equal to mass multiplied by velocity) generated prior to impact usually does not provide an accurate prediction of the magnitude of the actual force applied by the impact. This deficiency exists because conventional devices typically provide estimates of force independently of mass. Consequently, impact-force estimates provided by conventional devices can be insufficiently accurate for reliable or effective use in training.

Also, many conventional devices measure impact force one-dimensionally using force gauges. Unfortunately, one-dimensional force gauges are usually not effective tools for measuring the energy delivered from the various types of impacts described above because such gauges are designed to measure forces in only one direction. During an actual impact, the acceleration and impact vectors of an object striking a target are usually not one-dimensional linear; rather, these vectors almost always have components in multiple dimensions. Thus, a one-dimensional force gauge is usually unsatisfactory for measuring the angle of an impact and for providing data on other aspects of striking force such as multi-dimensional components of force vectors or even total impact force.

Other conventional devices measure impact forces applied to a target by mechanical forms of resistance such as mechanical springs, a suspended mass, an immovable object, or a variable resistance provided by another individual holding the target. Unfortunately, these devices typically cannot provide precise and consistent measurements of impact force. A suspended mass, an immovable object, or a variable resistance provides a resistance that increases proportionally with displacement of the target surface caused by the force of the impact. When training using these types of resistance, the athlete typically reduces the force of the strike quickly after making contact because sustaining or increasing the impact force after making contact with the target greatly increases the risk of injury to the athlete. As a result, the athlete is undesirably induced and conditioned to restrict or otherwise limit his strike in response to the physical limitations of the measurement device. Such conditioning typically leads the athlete away from sustaining a maximum application of impact force for the longest possible duration of impact.

Other conventional devices and methods are constructed of materials and employ methods that reduce the accuracy and consistency of the measurements. For example, certain devices measure impact forces applied against mechanical spring resistance or against hydraulic or pneumatic pressure generated by compression of a flexible, sealed member inside the target. Such types of devices do not exhibit adequate durability under the intense forces that can be generated by impacts to the target. In addition, impact resistance generated in this manner can be subject to substantial variation due to material fatigue and temperature variations. For example, springs usually exhibit changes in spring rate after repeated compression. Other "springy" components, such as fabrics, films, and foam rubber components, tend to stretch, weaken, and/or become more flexible upon receiving repeated impacts. These changes can substantially erode the consistency of measurements, even within a single testing session.

Another consideration in analyzing impact-strike performance is the time consumed in executing the strike. In conventional devices purportedly used for measuring the time consumed in executing impact strikes, the time data actually obtained usually pertain to time elapsed between giving the athlete a start signal and the instant the athlete makes contact with the target. Such a time measurement actually pertains to a combination of two separate events: the time required for the athlete's brain to recognize the start signal and to initiate muscle movement, and the elapsed time from commencing muscle movement initiating the strike to the onset of target displacement from the impact of the strike. Conventional devices are unsatisfactory in isolating and quantifying these two components separately.

SUMMARY

Among various aspects of the technology disclosed herein, impact-sensing and measurement systems are provided, along with corresponding methods for sensing and measuring impacts (such as produced in any of various sports) and related business methods. The impact-sensing and measurement systems perform, inter alia, reporting of impact data so that a user (e.g., an athlete undergoing training using the system) can obtain robust performance analyses as a function of the user's technique.

Certain embodiments of an impact-sensing and measurement system comprise two basic modules: one or more impact-sensor modules and at least one controller for processing data from the sensor modules. The controller can be configured as a module (e.g., a portable "management controller" module) or other data-processing and control module that is separate from and to which the impact-sensor modules are connected. Other system embodiments can comprise one or more impact-sensor modules (each having a respective built-in controller) but no management controller. Yet other system embodiments comprise one or more impact-sensor modules connected to a computer such as a "personal computer" (PC), with or without a management controller. The computer can be used to provide, for example, increased software and/or display functionality as desired, compared to a management controller. The impact-sensing and measurement system can also include an interactive DVD. In any of these exemplary configurations, the system generally provides objective measurements of parameters such as power, speed, accuracy, aerobic capacity, and/or consistency with which an impact is made. The system also can be configured to maintain a history of the user's performance in impact delivery and to provide feedback on the user's latest (or other) efforts at striking a target.

Each impact-sensor module of the system can include one or more accelerometers, dynamometers, magnetic-based sensors, optical-based sensors, or other suitable sensors, or a combination thereof (hereinafter collectively referred to as "impact meters"). The impact meters desirably are configured to measure the acceleration applied to the sensor during an impact event and to calculate the corresponding force applied by the impact to the impact meter, or to measure the force directly. Accelerometers are desirable for sensing impacts because accelerometers are durable and small. The accelerometers (or other impact sensors that are used) in the impact-sensor modules desirably are configured to sense accelerations in all three spatial axes.

The impact-sensor modules desirably are attachable or otherwise mountable at selected respective locations on a "target" such as a martial arts dummy, a helmet, a tackling sled, a punching bag, a ball, or other type of target. Alternatively to the target being something that is struck, the target can be an implement or other thing used by a person to strike something else. Exemplary in this latter regard are golf clubs, baseball bats, and the like.

Each impact-sensor module can include a respective controller in which an appropriate software application program is stored for running by the controller as required. The controllers in the impact-sensor modules desirably are connectable to a management controller (to which multiple impact-sensor modules can be connected) for communication with the management controller. The respective controllers in the impact-sensor modules can include means for providing audio feedback, visual feedback, or both, to a user. Alternatively, the management controller provides these functions of audio and/or visual feedback.

The impact-sensor modules in some embodiments can be configured to produce and measure impacts in a single axis. Alternatively, impact-sensor modules in other embodiments are configured to produce and measure impact data along a combination of two axes, or along a combination of all three axes. Measuring all three axial components of an impact allows determinations to be made of total force of an impact having vector components in multiple axes, and provides good feedback to the user in determining and assessing impact technique, e.g., whether the user is striking a target at a proper or otherwise desired angle in three-dimensional space.

As noted above, each impact-sensor module desirably measures respective vector components of an impact along all three spatial axes. To such end, and by way of example, such an impact-sensor module comprises a first impact meter (e.g., a first accelerometer) used for producing and measuring impact data along two axes (for example, the x- and y-axes in a Cartesian coordinate system, or the ρ- and θ-dimensions in a spherical coordinate system), and a second impact meter (e.g., a second accelerometer) for producing and measuring impact data in a third axis (for example, the z- or φ-axis). An advantage of an impact-sensor module capable of measuring along all three spatial axes is that the module can be mounted anywhere in any spatial orientation or direction. Impact-sensor modules capable of measuring along fewer than three axes (e.g., one or two axes) can be used as the situation indicates or if desired. For example, at a particular location on the target, three impact-sensor modules can be mounted, wherein impacts at the location are measured along the three spatial axes individually by the respective modules.

To process impact data collected by the impact sensors, the controller (e.g., management controller to which the impact-sensor modules are connected) desirably is configured to read data from the sensors, to process the data, to analyze the data, and/or to provide audio, visual, audiovisual, or other suitable feedback to the user. Exemplary devices providing visual feedback range from LEDs or target-lamp outputs (which can be application-specific and can be used to illuminate a certain target to be hit and to indicate that a particular impact was above or below a specific threshold of force) to full-featured color monitors that can display recreations of an impact (e.g., graphs such as bar graphs, pie graphs, line graphs, or other suitable videographic output).

Connections between the image-sensing modules and the controller can be by "hard" wiring or wireless connection. Hard wiring involves actual wires and/or cables interconnecting the modules and the controller. Hard-wiring can be advantageous due to the typically lower cost and reduced complexity of such connections compared to wireless connections. Wireless connections, on the other hand, can be more versatile in certain settings and can simplify addition of sensors to the target or moving sensors about the target. Exemplary wireless connections involve transmitting and receiving, for example, radio waves or light waves on which the signals to be transmitted are encoded. Impact-detection data obtained by a hard-wired or wireless impact-sensor module can be multiplexed by a multiplexer, converted into a digital signal by an analog-to-digital (A/D) converter, and then stored in a RAM until needed or otherwise used. The stored detection data can be read out sequentially from the RAM by a signal-processing unit, subjected to processing such as calculation, and formed into a signal to which is added identification information peculiar to each impact-sensor module. The signal can be transmitted to a management controller (desirably having a portable configuration) or computer, for example. The intervals with which vibration, temperature, and/or other impact parameters are detected can be set, if desired, at a predetermined time interval. Alternatively, the interval can set up by a trigger corresponding to a predetermined threshold value of the parameter. Thus, the volume of data to be processed can be reduced.

One or more impact sensors desirably are used to sense strikes to the target. If more than one impact sensor is used, each sensor desirably is placed on, mounted to, or otherwise situated relative to the target so that an impact to the target caused by a strike to the target can be sensed, thereby allowing more accurate registration of impact intensity. In one embodiment, the impact sensors produce a small voltage spike in response to a sensed strike.

As noted above, certain embodiments of the systems are configured to provide audio feedback to the user or other person. An exemplary audio-feedback device is an audio-playback device that indicates, by producing an audio signal, whether the target has been hit properly. The audio-feedback device can be built-in to the impact-sensor module or to the management controller. An exemplary audio feedback is a tone indicating whether the target has been struck properly. Another exemplary audio feedback is an artificial voice articulating to the user a suggestion of how to hit the target better. For example, the feedback voice may articulate "hit harder," "hit higher," or "the impact was slanted too far downward."

The management controller can be configured to control the impact-sensor modules through a packet-based communication protocol. Through this protocol, the management controller can request data from a specific impact-sensor module, and the queried impact-sensor module returns impact data to the management controller. The management controller also desirably regulates communication between itself and its impact-sensor modules, in which configuration the impact-sensor modules desirably are configured to store impact data produced at least since the last time the management controller queried impact data from the impact-sensor modules and at least until the next time the management controller board queries the impact data. The packet-based protocol also allows communication of impact data between the impact-sensor modules on the target and the management controller over a packet-based network such as the Internet. Thus, the impact data can be observed, analyzed, and commented on by someone, e.g., a trainer, at a remote location from the impact target.

In some embodiments, the management controller comprises a control processor that desirably includes or is at least connected to an audio decoder (e.g., MP3-type), an analog audio output, a flash-memory card reader, an asynchronous serial-port driver, and a power section. The control processor can be connected via a wired or wireless communications interface to a feedback means such as a computer monitor, audio or video playback device, graphical output device, or recording apparatus. Optionally, especially for portable applications, the management controller can be configured to operate on battery power, thereby eliminating any need for locating the management controller near an ac wall outlet, and thus allowing the controller to be located virtually anywhere.

One possible use of the impact-sensing and measurement system is in connection with an interactive workout. For example, the management controller can include a flash memory containing one or more files that indicate, for example, the number of impacts a person should execute during the workout, the minimum desired power of the impacts, and/or the frequency with which the impacts are made. If the parameters specified in the file(s) are not met, then the management controller can produce a pre-recorded audio response output as feedback to the user.

The management controller can be configured so as to act upon received impact data, based on the user's individual stored program profile. The program profile can be supplied to the management controller from a removable flash-medium device so that different types of applications can be implemented without having to add more hardware. The program profile can also be used for decoding coded files (e.g., MP3 files) and for playing the decoded output to an on-board jack or analogous device to which a headphone or one or more external speakers can be connected by the user for listening to the output. Alternatively, the output signal can be provided to another external playback device. Further alternatively, to develop profiles and interactive training routines, a monitoring program that runs on an extraneous computer connected to the system can be used for logging impact data and displaying results graphically.

The impact-sensing and measurement system can contain a removable memory device (such as a floppy disc) so that different people can use the same system in their respective training regimens without damaging the recorded data of another user such as a previous user. In this regard, the management controller can be configured to accept new or updated programs or criteria to provide a measurement of a workout's degree of "success." New and/or updated programs can be loaded directly using a local PC, or such programs can be downloaded via the Internet. One or more removable flash memory cards can be used for programming specific workouts. Examples of such memories include, but are not limited to, "MMC" (multimedia card), "SD" (secure digital), or "USB" (universal serial bus). Multiple flash-device type capabilities can be included.

An embodiment of the image-sensing and measurement system can embody methods for doing business, utilizing the management controller and applicable training programs. A distributor can provide a person with a management controller and, thereafter, license the use of certain training programs that run on the microprocessor in the management controller. Alternatively, a distributor can supply training programs, provide updates to the licensed programs, and/or provide new training programs over the Internet or other network to the user's management controller. Each time a management controller, a license, an update to a training program, or a new training program is supplied to the user, the user pays a fee to the distributor.

The foregoing and other features, aspects, and advantages of the technology disclosed herein will be more apparent from the following detailed description, which proceeds with reference to the accompanying drawings.

DETAILED DESCRIPTION

The description is set forth in the context of representative embodiments that are not intended to be limiting in any way. In the following description, persons of ordinary skill in the relevant art will understand that, where the term is used, an "accelerometer" can be replaced with a "dynamometer" or other impact sensor. The impact sensor can be based, for example, on optical measurements, magnetic measurements, and/or inertial measurements.

First Representative Embodiment

Figure 13:
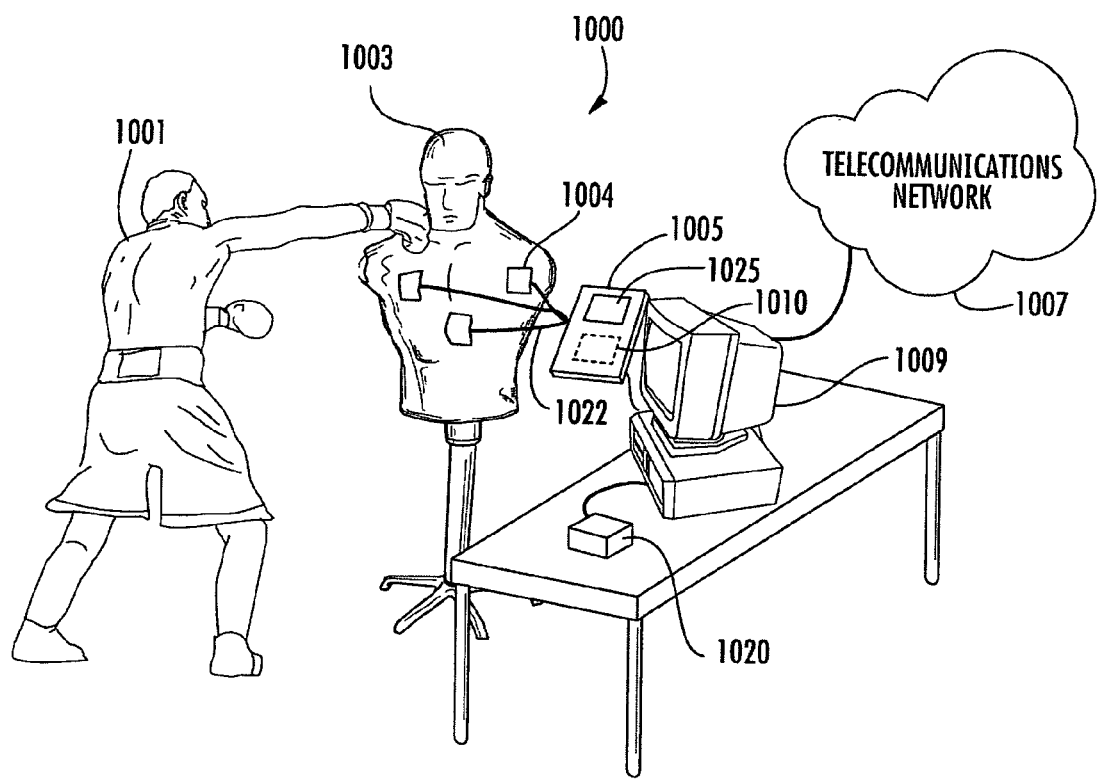
FIG. 13 depicts a representative embodiment of an impact-sensing and measurement system under an exemplary condition of actual use.

Turning first to FIG. 13, a representative embodiment of an impact-sensing and measurement system 1000 is depicted that is used in association with a target 1003 (e.g., a training dummy). The target 1003 is positioned so as to be struck by an athlete 1001. As discussed below, the target 1003 is in communication with a controller module 1005. The controller module 1005 desirably is portable, and desirably functions as a management controller, as discussed later below.

Attached to the target 1003 are one or more impact sensors 1004 that detect, and desirably record, impact strikes delivered to the target 1003 by the athlete 1001. Desirably, the target 1003 includes multiple impact sensors 1004 that are respectively positioned in various locations as required or desired for obtaining measurements of the locations and power of impacts delivered to the target 1003. For example, the target 1003 can be configured for receiving strikes associated with any of various actions in sports such as, but not limited to, pitches, throws, hits, passes, and shots. The impact sensors 1004 are configured not only for measuring the locations and power of impacts but also the angles at which the impacts are delivered to the target 1003. These angles can be determined from data concerning the magnitude of impact force in each spatial axis. For example, in a Cartesian coordinate system, an impact typically has vector components in each of the x-, y-, and z-directions. An impact having a large magnitude of force in the z-direction relative to the x- and y-directions may be too vertical for maximal effectiveness as a strike in the subject sport.

In the depicted embodiment, three impact sensors 1004 are positioned beneath a surface of the target 1003 in a circular pattern in which the impact sensors are spaced 120° apart from one another. Alternatively, depending upon the purpose of the target 1003, the impact sensors 1004 can be located in other positions on the target that are more suitable for producing the desired data concerning impact strikes delivered to the target. For example, if the target 1003 is a training dummy for use in martial arts, then the impact sensors 1004 can be located in the "head," "chest," or "abdomen" regions of the dummy. In another example, if the target 1003 (having a substantially different configuration than shown) is to be used for measuring impact delivered by a swung golf club, then the impact sensors 1004 can be located in the clubhead of the golf club. In yet another example, if the target 1003 is to be used for training in other applications, such as law enforcement, helmet testing, or the like, then the impact sensors 1004 can be located in those areas of the target where impacts are most likely or intended to occur. Thus, an impact striking a region of the target 1003 at or near a location of an impact sensor 1004 can be sensed as a stronger impact than an impact striking a region of the target that is more remote from an impact sensor.

From the foregoing, it will be understood that various embodiments of the system can be used for training in football, baseball, softball, tennis, hockey, soccer, or any other sport in which speed, power, and/or accuracy of impacts are important.

Each impact sensor 1004 in the depicted embodiment includes one or more respective accelerometers. Each accelerometer desirably is a semiconductor-type in view of the typically minimal size, high durability, and high reliability of semiconductor-based accelerometers, as well as their easy mountability to a printed circuit board. A single accelerometer measures acceleration applied to the sensor along a single axis. While the accelerometer is at rest, it experiences 1×g acceleration toward the earth's center. To measure absolute force applied to a location of an impact sensor 1004, the impact sensor 1004 desirably measures accelerations applied to all three spatial axes (Cartesian, polar, or spherical). In this embodiment, each impact sensor 1004 comprises two accelerometers, a first accelerometer that measures acceleration in two directions (e.g., x and y) and a second accelerometer that measures acceleration in one direction (e.g., z). Alternatively a single accelerometer capable of obtaining measurements along all three spatial axes can be used.

The controller module 1005 desirably is configured to execute at least three general functions: (1) storage of data obtained from impact measurements performed by the impact sensors 1004, (2) performing comparisons of impact measurements to a predetermined or previously obtained set of data, and display and/or coordinate the display of measurement results. In addition, the controller module 1005 can be configured to retain such comparisons for later recall and/or use. To these and other ends, the controller module 1005 (more specifically the management controller in the controller module) desirably includes a microprocessor 1010, which is described more fully below. As noted above, the controller module 1005 desirably is portable.

The controller module 1005 also desirably includes a display 1025, such as a display "screen," configured not only for viewing of impact data but also for inputting data (e.g., for comparisons of data obtained from subsequently made impact strikes) electronically into the controller module 1005. To such end, the controller module 1005 can be, and desirably is, programmed with a software program that performs any one or more of the following: (a) graphically displays each strike on one or more axes of a suitable coordinate system (i.e. Cartesian, polar, or spherical) in real time; (b) compares current impact data against prior impact data (obtained, e.g., from a previous workout or from a different impact technique); (c) calculates a rolling average (e.g., workout-to-workout or technique-to-technique) and displays a graph of performance trends from the rolling-average data; (d) receives data concerning a modification of an athlete's workouts and/or techniques for downloading to the controller module 1005; and (e) permits an instructor or other person to input training tips and/or other feedback regarding the athlete's impact performance for review on demand by the athlete.

The software programmed into the controller module 1005 also can facilitate comparisons, by the controller module, of data concerning a current impact strike to the target versus a previous impact strike made during a current workout or previous workout. The software also can provide textual feedback to the athlete or other user regarding the comparison, wherein the feedback can be based, for example, on an analysis of variance (a statistical analysis involving an analysis of the difference between what is expected and what actually occurs) of current data versus selected previous data.

As noted above, the controller module 1005 desirably includes a memory (e.g., in or associated with the microprocessor 1010) for storing any of various data input into the controller module 1005 by the user, for storing data obtained from the impact sensors 1004, and/or for storing any of various data-processing routines. By way of example, the memory in the controller module 1005 is sufficient for storing data obtained from approximately sixty workouts. With such a memory, if a user wishes to maintain a more permanent and/or more extensive record of data, the user can upload data from the memory in the controller module 1005 to a separate computer 1009 via a serial port on the computer 1009. Applicable software in the computer 1009 can be used for calculating data trends exhibited among and between various workouts in which different striking techniques are tried by the athlete and/or various workouts involving the same striking technique, updating calculated averages for each measurement with each lot of new data, and/or providing enhanced display of measurement results. The controller module 1005 also desirably calculates the respective force (magnitude and direction) of each impact strike to the target 1003 and stores the force data for use in, for example, "scoring" the strikes and/or historical comparisons. A workout's "score" can be calculated, for example, by multiplying the number of impacts made in the workout by the average force of the impacts (this calculation is mathematically equivalent to summing the force of all of the impacts made within a given workout). The data for each impact optionally can be forwarded to the computer 1009 so that the data can be viewed in a more feature-rich graphical environment.

The controller module 1005 can include means for determining the number of strikes delivered by the athlete 1001 to the target 1003 over a particular interval of time. Such a means can comprise simply a counter (not shown but integrated into the microprocessor 1010, for example) that registers a count each time one or more of the impact sensors 1004 registers a strike. Alternatively, the controller module 1005 can include an internal clock (not shown, but integrated into the microprocessor 1010, for example) that can be started and stopped on command by the user as required for establishing a predetermined time interval in which strike data is to be taken. For example, the counter can be programmed to stop counting strikes made after the internal clock has elapsed a predetermined time interval. The particular time interval can be changed by the user and/or varied automatically. The latter capability could be used in instances in which a user is operating the system 1000 in conjunction with a multiple-interval training regime and desires to perform multiple sets of impacts over variable time periods. Conversely, the controller module 1005 can be configured to receive data corresponding to a predetermined number of strikes delivered to the target 1003, wherein the controller module 1005 determines from such data the respective time period (e.g., an average time period) required for the athlete 1001 to strike the target 1003. The controller module 1005 also desirably is configured to display, in real time, on the display 1025 the power of a strike. The displayed data can be in numerical and/or graphic form. Thus, the user (e.g., the athlete 1001 or an instructor) can evaluate each impact. At the end of the designated period of time, the impact sensors 1004 stop measuring impact data and the display 1025 exhibits processed data concerning the total number of strikes made during the time period, the most powerful strike made in the period, the average power of all the strikes made in the period, and the total score for the particular technique used during the time period. The display 1025 also can be used for displaying similar data for prior workouts (other time periods) using the same or different striking techniques.

Figure 14:
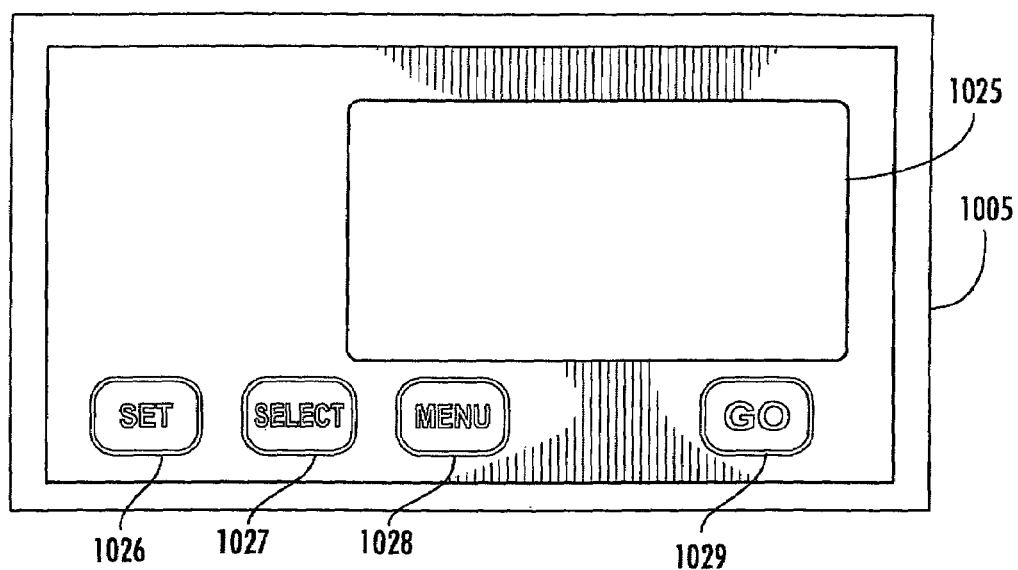
FIG. 14 is a front exterior view of a representative embodiment of a portable controller module, showing the display and several control "buttons."

In a particular embodiment, and by way of example only, as shown in FIG. 14 the controller module 1005 is approximately 4.25 inches long, 2.5 inches deep, and 0.75 inch high (i.e., 11 cm×6.4 cm×2 cm). The display 1025 is a LCD (Liquid Crystal Display) type including a "screen" about 2.25 inches wide and about 1.12 inches high). The display 1025 can include manual controls such as elevated "buttons" 1026, 1027, 1028, 1029 denoted for the respective functions of SET, SELECT, MENU, and GO.

Strike impacts registered by the impact sensors 1004 can be transmitted from the target 1003 to the controller module 1005 by direct cable connections (as shown) or transmitted wirelessly using an antenna (not shown, but described later below). One or more impact sensors 1004 obtain impact-force data along at least one (preferably all three) axes and deliver the impact data to the controller module 1005. The microprocessor 1010 can be any of various suitable processors (desirably programmable) such as a DSP chip, a microprocessor, or the like. The controller module 1005 also can be configured to provide a user-interface function so as to allow a user to control any of various aspects of the device such as output, memory storage, and control.

The controller module 1005 also may be configured to include an RF circuit configured for communication with wireless impact sensors 1004, thereby eliminating possibly cumbersome wiring 1022 between the impact sensors 1004 and the controller module 1005. Thus, each impact sensor 1004 can be configured to perform wireless communication with the controller module 1005.

Any of various training programs can be loaded from respective media into the microprocessor 1010 using an appropriate media player. Thus, the controller module 1005 can be configured to maintain a profile of the user (e.g., the athlete 1001) with pre-determined workout levels and choices of strike techniques. The workouts can be downloaded into the controller module 1005 before a first use of the system 1000 or at any time thereafter via a computer (e.g., the computer 1009) operated by the user (e.g., the athlete 1001) or by an instructor or trainer. In addition, the computer can be used for further customization of the athlete's workouts.

The controller module 1005 can be connected to any impact sensor 1004 at any location on the same target 1003 or on multiple targets. The user (e.g., athlete 1001) simply indicates the particular impact sensor(s) 1004 (and/or target 1003) he intends to strike and selects the particular workout program he will execute. The controller module 1005 can be connected to the impact sensor(s), as noted above, by wire or wireless connection. The controller module 1005 can be mounted on the target 1003, held apart from the target by an instructor or trainer or workout partner, or placed at a remote location from the athlete 1001 and the target 1003.

The controller module 1005 desirably is configured to determine a "score" or other quantitative measurement that represents the striking performance of the athlete 1001. A maximal score value can represent the most powerful strike made by the athlete 1001 to the target 1003 during a designated period. The athlete 1001 achieves a higher maximal score by striking the target 1003 with greater power, improved technique, and/or improved accuracy. A total score (e.g., number of strikes multiplied by average striking force over the designed period) can represent striking consistency, striking power, and/or striking velocity. Hence, the score can embody striking power, striking aerobics, and striking consistency factors and can be an objective measurement of overall striking skill of the athlete 1001.

The impact sensor system 1000 can be used in conjunction with an interactive workout guided by information from an extraneous source. For example, the interactive workout can be run by and displayed from a DVD-ROM type medium played on a DVD player or driver 1020 (Digital Video Disc in Universal Disk Format, also sometimes termed Digital Versatile Disk). The DVD player 1020 can be configured to read CD-ROM, CD-RW, or CD-R discs. The program on the DVD can include techniques and parameters related to the specific sport in which the athlete's striking technique is to be used.

The DVD and/or the controller module 1005 can be programmed with preset workouts and/or workouts that can be modified (custom workouts). The user (e.g., athlete 1001) selects the particular workout to be followed. If the workout is on the DVD, the workout is downloaded from the DVD to the controller module 1005, and the athlete 1001 commences the selected workout.

Second Representative Embodiment

A second representative embodiment of the impact sensor system is configured so as not to require a controller module or extraneous computer. In this embodiment, each impact sensor 1004 can include its own respective memory and microprocessor and is thus termed a respective "impact-sensor module." For example, strike-force data obtained by an impact-sensor module 1004 can be stored by the impact-sensor module (from which the data can be downloaded as desired) and used by the athlete 1001 to determine whether he is striking the target 1003 with a desired magnitude and direction of force. The memory can be a flash memory or other type of memory that maintains data until the data is deliberately cleared by the user from the memory. In this embodiment, the impact-sensor modules 1004 can include at least one display configured to provide impact data to the athlete 1001 or other user.

Alternatively, impact data from the impact-sensor modules 1004 can be transmitted (e.g., wire-transmitted) directly to the computer 1009. To such end, each impact-sensor module 1004 desirably includes at least one sensor element (e.g., accelerometer or dynamometer), a multiplexer, an analog-to-digital (A/D) converter, a RAM (Random Access Memory) or analogous data-storage unit, and a signal-processor. Thus, each impact-sensor module 1004 is a respective strike-detection unit for detecting a strike-induced vibration or temperature change of the sensor element(s) in the module, for converting the vibration or temperature change into a corresponding electric signal, and for outputting the electric signal. The multiplexer multiplexes the strike signals produced by the respective sensor element(s) so that the signals can be separated from each other as independent impact-detection data. The A/D converter converts the signals (which are analog signals) produced by the sensor element(s) into corresponding digital signals. The RAM (or analogous data-storage unit) stores the digital impact-detection data from the A/D converter for later processing. The signal-processor makes sequential "calls" for the impact-detection data stored in the RAM and processes the data to obtain a comparison of the impact-detection data with predetermined threshold values for vibration and temperature.

After processing the impact-detection data as described above, the signal-processor routes the processed data, together with identification information peculiar to the respective impact sensor, to the computer 1009 and/or controller module 1005. (Alternatively, the vibration and/or temperature data, with sensor-identification data, can be routed directly to the computer or controller module for processing by the computer or controller module.)

The A/D converter, the RAM, and the signal-processor of an impact-sensor module 1004 may be integrated into a respective processing unit. If the impact-sensor module comprises multiple sensor elements, then sensor-identification data typically is produced for each sensor element that has detected or otherwise produced corresponding impact data, and the sensor-identification data is provided along with the impact data to the processing unit. The processing unit is connected by wiring or by a suitable remote (wireless) means to a computer 1009 or controller module 1005 that can transmit and receive signals to and from the processing unit. If the processing unit is connected wirelessly to the controller module 1005 and/or computer 1009, then the processing unit (as well as the respective controller module or computer) can include, for example, a radio-wave transceiver, an ultrasonic transceiver, or infrared transceiver for sending data back and forth between the processing unit and controller module or computer.

Third Representative Embodiment

In this embodiment, a user can use the controller module 1005 as an intermediary device between the impact sensors 1004 and a program on a computer 1009. In this configuration, the controller module 1005 can be placed in a "bypass" mode and the computer program can be initiated so as to enable the computer 1009 to calculate and graphically display, for each of multiple time intervals, the athlete's respective impacts in all three axes in real time. At the end of each time interval, the athlete 1001 (or other user) can "see" each and every respective strike as well as the "total" scores. The scores can then be saved to the computer program. At any of various points in time, the athlete 1001 (or other user) either can clear all results or can connect the controller module 1005 to another computer (or to the same computer 1009) to which the results can be uploaded and from which a new workout can be downloaded.

As shown in FIG. 13, the computer 1009 is connected between a telecommunications network 1007 and the controller module 1005. Also connected to the network 1007 is a "host" computer (not shown but well understood in the art). The host computer can comprise a video server, a database, and a retrieval system that enables a user on the network 1007 (e.g., the Internet), to which the host computer and the user's computer are connected, to retrieve information from the host computer. In the context of the instant system, a host computer can contain a program pertaining to, for example, a training simulation or other workout. A user of the instant system, via the computer 1009, can retrieve the program from the host computer over the network 1007.

The centralized video server can be a conventional computer system that generically comprises a network-coupling device of a suitable type such as a high-speed analog or digital modem. The centralized video server also usually includes a central processing unit (CPU), a display, and a keyboard allowing operator interaction. It will be understood that various means other than a keyboard can be used for entering data and observations, such as a light pen, a pointing device such as a computer mouse, a touch screen, a microphone, a video camera, or other data-input device, any of which can be configured to serve a function equivalent to a keyboard.

The centralized video server can itself be a computer network. In particular, the centralized video server may comprise one or more separate web servers and/or separate databases with extensive RAM and disk memory storage, or their functional equivalents. The centralized video server can include installed firewall hardware, as is common in the art. Portions of the video server may be physically separate from one another, and the portions may communicate with each other over the Internet or other network. The centralized video server desirably is functionally coupled to the Internet and thus to user computer systems via one or more dedicated, high-speed lines. The requirements for the video server and the high-speed line are dictated at least in part by the expected volume of data to be exchanged with users at user computers and by the number of such user computers and users that are expected to access the video server.

The host computer (including centralized video server) and its network connection are preferably selected based upon their anticipated peak loading requirements. As an example of a starting point from which to specify a suitable video server and network connection, the high-speed connection can be a standard T1-type connection to the Internet as provided by an Internet Service Provider (ISP). The video server itself can comprise dual INTEL® Pentium 4® processors. The web-server software can be any that allows the server to communicate via a standard protocol. On the Internet, this would include the well-known TCP/IP and Web-based (HTTP, SHTTP) protocols. Examples of such servers are the NETSCAPE® Server 3.0 and MICROSOFT® Internet Information Server (IIS). The centralized video server also may comprise a hardware database server. A person skilled in the art, upon understanding the nature of the system disclosed herein and given the implementation details, would be able to select and configure appropriate server hardware. The database software desirably is sufficiently fast and powerful to handle the anticipated user volume. Advantageous database software systems in this regard are produced by Oracle Software and Microsoft Corporation, and may include, for example, a MS SQL Server.

As noted above, the host computer on the network is used in conjunction with a user computer that is connected via the network (e.g., Internet) with the host computer. The user computer includes a network-coupling device that enables the user computer to be coupled to the network. Depending upon the type of network connection, a modem may be used to couple the user computer to the network via a telephone line. Illustrative of existing types of computer systems, the user computer 1009 is depicted as a conventional "personal" computer including a display, a keyboard, and a mouse. Such a personal computer can include, for example, an INTEL® PENTIUM® processor and can be equipped with Ethernet, a DVD Player, and a hard drive. The user computer 1009 desirably is located at the training site and desirably is dedicated for use in training simulations. In a commercially successful computer system configured in this manner, it is anticipated that a large number of user computers of various types would be in communication with the host computer.

Thus, if desired, a user can communicate with a personal trainer on the network 1007 over a long distance. The personal trainer can be directed by the user to design a training program to be installed on the controller module 1005 via the Internet or some other telecommunications network 1007. The athlete 1001 then performs a workout according to the training program. In this regard, and as desired or required, the athlete 1001 can make any of various connections from his body, e.g., for measuring pulse rate, to the controller module 1005 and thus to the user computer 1009 and host computer, which also receive data from the impact sensors 1004. Thus, the athlete 1001 can track his performance in communication with the host computer. Alternatively or in addition, the athlete can transmit data concerning his workout and performance over the network 1007 to the trainer.

The impact sensors 1004 in this embodiment can be operably connected to the controller module 1005 by cables 1022 or other interface means, including by wireless means. The impact sensors 1004 can include respective dynamometers, accelerometers, or the like. The controller module 1005 is connected to a tracking device configured for tracking speed, acceleration, energy consumption, and any of various other dynamics associated with the workout. Similarly, impact loads exerted by the athlete 1001 on the impact sensors 1004 may be sensed by a load transducer that transmits signals from the impact sensors 1004 to the tracking device.

Data are transmitted to the tracking device from the impact sensors 1004, wherein the tracking device tracks the data corresponding to the motion of the impact sensors. As noted above, the transmission can be via cable 1022 or other means such as wireless transmission. As exemplary wireless means, the transmission can be by radio waves, light, sound, or ultrasound, wherein each impact sensor and the controller module 1005 includes an appropriate transmitter and pickup. A signal can be reflected to a pickup by a target attached to a body member of the athlete 1001 and used for detecting position, speed, acceleration, direction, and the like of an impact. Other sensors may be similarly positioned to detect desired feedback parameters.

Actuators may be configured as resistance members configured to resist motion by a body member of the athlete 1001, either directly or by resisting motion of mechanical members movable by the athlete. The resistance member, as in the case of many actuators and devices for providing stimuli, may be controlled by a combination of one or more inputs. Such inputs may be provided by pre-inputs, by programmed instructions, or by controlling data that has been pre-programmed into the workout program. Inputs also may be provided by stored, user-determined data. Inputs also may also be provided by data corresponding to signals collected from the impact sensors 1004 and stored by the tracking device or the controller module 1005.

An audio sub-system of the computer 1009 can reproduce audio data stored in the medium. For this purpose the computer 1009 desirably includes a suitable "sound board." ("Board" is an industry-conventional term that is used herein, but is not limited to a discrete circuit board. Many computers now have sound capability integrated into their motherboards.) To convert electrical signals into sounds that are audible by users, the computer 1009 also includes an audio subsystem that includes at least one speaker.

The computer 1009 also desirably includes a video subsystem that reproduces video data stored in the medium and outputs either or both of television (TV) type video or SVGA signals to a monitor (shown associated with the computer 1009). Thus, a user can view the playback of video data on the TV screen or other computer monitor, which has a suitable resolution and refresh rate for providing crisp viewing of the video presentation. Virtually all computers today already include some type of "video board" (i.e., video-signal-creation capability) and a monitor.

It is noted that not all components of the computer 1009 need be physically present in one "box" or even at a single location. As discussed above, the impact-sensing and measurement system 1000 may use a computer network 1007, such as the Internet, to allow users on different continents to employ the exercise system using Internet-connected network computers (NCs) and media provided by a server computer that can be located on yet another continent. Thus, it is possible to hold "communal" sessions in concert, for competitive sporting events, or for coached exercise regimes.

Fourth Representative Embodiment

Alternately to the embodiments described above, the impact-sensing and measurement system can utilize a single powerful computer system to run respective workout sessions for multiple users on multiple instances of equipment. These workout sessions may be similar or quite different and may use entirely different data from the medium. These workout sessions can be for workouts performed in concert with each other or in competitions. For example, a health club might employ the impact-sensing and measurement system with one computer system to control, in a concurrent manner, a variety of equipment for its various individual member-users, all in manners suiting their individual tastes and capabilities.

Alternately, the medium may be stored in a suitable mass-storage system, for example, on a very high-capacity hard drive on a network server within the computer system. The media may contain various types of pre-recorded data files including video files (e.g., compressed AVI or MOV formats) or audio files (e.g., in WAV, MIDI, and other formats). The media also may, but not necessarily, contain a software program for loading into and execution on the computer system. The software program may be supplied entirely separately (e.g., downloaded from a bulletin board, BBS, or an Internet site). The executed version of the software program may be stored in mass storage on the computer system rather than being loaded from the medium each time before use, thus permitting all of the capacity of a unit of the medium to be dedicated to the data files.

In operation, the impact-sensing and measurement system is highly user-interactive. However, the interactive features are not intrusive, as is the case for many conventional systems. For example, a user selecting a particular workout program also is queried to specify a desired nominal level of difficulty at which he would like to exercise (e.g., basic, advanced, professional), and to select the particular feedback information he also would like to see while working out (e.g., hits, time, score). This information, as feedback, can be displayed on the monitor or TV screen incorporated into the system or even on another, separate display device.

The various training programs provide a person with an ability to follow a workout program using the system described herein. For example, a program can contain instructions for the athlete 1001 to strike the target 1003 a predetermined number of times in a predetermined time interval, e.g., ten times in thirty seconds. Also, a program might contain instructions for a person to strike a certain part of the target a predetermined number of times. In this and in other embodiments, an average impact over multiple intervals of time can be calculated. For example, for training purposes, a total score can be calculated by multiplying the number of times the target was struck by the "average" impact.

A combination of inputs for control of actuators also may be used to protect the user. For example, the controller module 1005 may override pre-programmed inputs from the user or other source stored or inherent in software and the like. That is, feedback corresponding to the condition of the user 1001, as detected by the impact sensors 1004, may be used to adjust exertion and thus protect the user.

Session data may be in the form of information corresponding to positions, motions, condition, and so forth of an opponent. Thus, much of the session data may be provided to the user and controller for use during a contest, competition, or the like. Thus, the data traffic passed through the transceiver of each of two or more remotely interacting participants (contestants, opponents, teammates, etc.) may be minimized to improve real-time performance of the impact-sensing and measurement system, and the wireless communications of the transceiver.

Two remote users may experience interaction based upon tracking of the activities of each. Thus, the impact-sensing and measurement system may track the movements of a first user and transmit to a second user sufficient data to provide an interactive environment for the second user. Feedback on each user may be provided to the other user. Thus, rather than a synthesized environment, a real environment may be properly duplicated.

For example, two users may engage in mutual combat in the martial arts. Each user may be faced with an opponent represented by an image moving through the motions of the opponent. The opponent, meanwhile, may be tracked in order to provide the information for creating the image to be viewed by the user.

In another embodiment electromuscular stimulation (EMS) apparatus may be worn by a user to assist the user to work out at a particular speed, or at a particular exertion level exceeding levels normally experienced. Alternatively, the EMS may be worn to ensure that the user's muscles actually experience total exertion in a defined, limited time. Thus, for example, a user may obtain the equivalent of a one-hour workout from only thirty minutes of actual activity. Likewise, in the above examples involving two competitors, one competitor may be handicapped. That is, one user may receive greater exertion or a more difficult workout against a lesser opponent without being credited with the exertion by the system. Speed, energy, and so forth may also be similarly handicapped for martial arts contestants in the above example. Control of the EMS apparatus can be by, or coordinated with, operation of the computer 1009, which allows interface of the EMS-based program with impact results achieved with the EMS regimen, as sensed and measured by the impact-sensing measurement system.

Thus, one physical object may be positioned in space relative to another physical object, although one of the objects may be a re-creation or duplication of its real object at a remote location. Rather than synthesis (a creation of an imaginary environment by use of computed images), an environment is duplicated (represented by the best available data to duplicate an actual but remote environment).

Similarly, user-selected inputs may be provided. A user, for example, may select options or set up a session through a programming interface module. Alternatively, a user may interact with another input device connected to provide inputs through the input module. The impact-sensing and measurement system may obtain a performance of the user in accordance with the user-selected inputs.

In addition to these control functions, the impact sensors 1004 connected to the tracker device may provide feedback to a user 1001. The feedback, in combination with the user-selected data and the pre-inputs, may control actuators connected to the wiring 1022 that interconnects the impact sensors 1004. The condition of a user as indicated by feedback from an impact sensor 1004 may be programmed to override a pre-input from the controller module 1005, or an input from a user through the programming interface module.

A heart-rate monitor (not shown) is yet another feature that can be included in the present embodiment. A training program stored on the microprocessor 1010 can include an application for collecting, analyzing, and storing measurement readings obtained as the user 1001 strikes the target 1003. An input port (not shown) on the controller module 1005 can be dedicated to a heart-rate-monitoring device. The microprocessor within the controller module 1005 can collect the data from the heart-rate monitor through the input port. The data can then be stored in the memory to be reproduced on a display screen of the controller module 1005, or the data can be stored in the memory for later use. Such later use can include comparing the heart-rate data with more recent heart-rate data or other stored heart-rate data to determine the health progress of the person being monitored.

Fifth Representative Embodiment

This embodiment is directed to methods of doing business. A distributor provides a person with any combination or variation of the embodiments described above. A centralized distributing system includes a library in which new training programs and updates to training programs are stored and maintained by the distributor. These new and updated programs can be packeted and transmitted over the Internet or other network by a centralized distributing system and can be either manually installed on a local portable controller by the user or automatically installed on a local portable controller by the centralized distributor.

Every controller installed by the distributor can be provided with a number of pre-set workouts for a particular sport selected by the controller. Other applications such as record-keeping, additional programs for the selected sport, pass-through programs that allow scores to be represented graphically in real time, and programs for other sports may be obtained piecemeal or as part of a subscription service. Regarding subscription, a user can subscribe to a service for updating interactive programs by submitting personal information to a centralized database. The centralized database can maintain a record of the user as well as other subscribers. The record may contain information pertaining to the personal characteristics of the user, e.g., whether the user has requested and been provided with an updated training program within a recent, predetermined period, and whether the user would like to be informed of new updates to his current program. At predetermined time intervals, or upon request from the user, a central database provides updates to training programs already possessed by the user or the user is provided with new training programs. These packet-based communications performed by the present system are consistent with other communication protocols employed on the Internet. Hence, updates can be packeted and sent to the user over the Internet or other packet-based communication network.

In exchange for updates and new training programs sent by the system to the user, the user can maintain a credit account, representing a monetary value, on the central database. Whenever the user receives an updated or new training program from the central database, the database debits the user's credit account according to a predetermined monetary value of the program. The central database also can credit the user's account upon receiving payments from the user.

Sixth Representative Embodiment

This embodiment is directed to exemplary hardware for implementing any of various embodiments described above.

An exemplary impact sensor includes a two-axis accelerometer, such as a Motorola MMA3201, capable of measuring accelerations of up to 40×g in the x- and y-axis directions and capable of withstanding impacts of up to 200×g. The impact sensor also desirably includes a second accelerometer, such as a Motorola MMA1201, capable of measuring accelerations of up to 40×g in the z-axis direction and capable of withstanding impacts of up to 200×g. Other types of accelerometers can be used instead. The noted accelerometers provide a 0- to 5-volt analog output, the magnitude of which corresponding to the acceleration currently being experienced by the accelerometer. The analog output voltage is input to a microprocessor on the controller module 1005.

The impact sensors 1004 can be daisy-chained together for multiple-sensor applications. To such end, each impact sensor 1004 desirably includes two identical connectors that allow a first cable to be used as an input and a second cable to be used as an output, wherein the cables can be connected to one or more additional impact sensors located either upstream or downstream. Since the two connectors are wired identically, either can be used as an "input" or "output."

The controller module 1005 includes a controller/management board, described later below. The impact sensors 1004 transmit data to the controller/management board by a "speaker wire" when the impact sensors have been addressed by a command from a controller/management board, wherein the speaker wire can be used by all of the impact sensors 1004 using only a single line. Whenever a particular impact sensor 1004 is not transmitting on this line, the line can be used as an input to that impact sensor to avoid conflict with another impact sensor using the same line as an output.

The controller module 1005 is connected to a computer 1009 via a USB connection. The controller module 1005 also has two additional ports. The first port is a serial port, which can be a ⅛-inch headphone-style jack, used for communicating with the impact sensors 1004. (Alternatively, the connections to the sensors can be wireless, which would eliminate the need for the first port.) The second port is a USB port used for communicating with the computer 1009. The second port can be a USB Mini-B style connector.

Each impact sensor 1004 can be "intelligent" by configuring it as a respective impact-sensor "module" comprising a respective microprocessor with at least one built-in Analog-to-Digital Converter (ADC). An exemplary microprocessor is an Atmel ATtiny26 microprocessor. Other types of microprocessors alternatively can be used. The microprocessor can have multiple ADCs. A typical Atmel ATtiny 26 microprocessor includes up to 10 ADCs and runs at up to 16 MHz. These microprocessors also include built-in RAM and flash memory for code storage, and are powered by a +5 V power supply, which matches the maximum output voltage from the accelerometers.

In this embodiment the operating software for the respective microprocessors in the impact-sensor modules is implemented in AVR assembly language. The operating software responds to a query from a management controller (located in the controller module) by providing data concerning the maximum force applied to the respective accelerometers since the last query. These communications are made in an asynchronous serial manner. The operating software also performs analog-to-digital conversion of each of the three accelerometer inputs and stores data concerning the highest force measured since the previous query. The operating software also turns on and off target LEDs located on each sensor, based on serial-communications commands from the management controller.

Measurement data obtained by the accelerometers in the impact-sensor modules can be displayed in any of various ways. Exemplary display schemes include numerical displays and/or LEDs associated with each accelerometer. By way of example, an LED display can be configured to illuminate each time the respective accelerometer registers a force exceeding a predetermined magnitude. The predetermined magnitude can be preset during manufacture of the impact sensor or set whenever the user is setting up a training program. As another example, the display can exhibit measurement data, obtained by the respective accelerometer, in sinusoidal form on a time-versus-force graph. Other display schemes are possible such as bar graphs and line graphs. Line graphs effectively depict changes in a variable, e.g., impact power, number of impacts, or time to complete a program, over time. Bar graphs also can depict these variables in a meaningful way.

Main controls and processing functions on the management controller are performed by an on-board microprocessor. An exemplary on-board microprocessor is an Atmel AT89C51SND1C processor that includes a built-in MP3 decoder. Other types of microprocessors alternatively can be used. Further alternatively, a microprocessor lacking an internal MP3 decoder but that is connected to a discrete external MP3 decoder (e.g., on the management controller) can be used. The microprocessor on the management controller also desirably includes a built-in RAM and flash memory for code storage, and desirably includes USB interface for inputting program-software upgrades. The management controller further desirably includes a Multimedia Card (MMC) flash memory, which can be used for customizing the "behavior" of the management controller. If desired, the RAM and/or flash memory can be separate devices from the microprocessor on the management controller.

The Atmel microprocessor on the management controller decodes MP3 audio signals and produces an I2C digital audio interface that can be used for interfacing to an external digital-to-audio converter such as a Texas Instruments PCM1771 DAC. This digital-to-audio is a 24-bit audio type and includes a built-in headphone amplifier, the latter allowing headphones to be connected directly via a mini-headphone jack. Alternatively, an audio-output signal from the digital-to-audio can be connected to an external set of powered speakers such as PC-style speakers.

The microprocessor on the management controller also desirably includes an asynchronous serial-port driver used for communicating with each of the impact-sensor modules. The serial-port driver also can be used during development for commanding and controlling the microprocessor. The serial port desirably is a female DB-9 connector having a pin-out allowing connection to a PC serial port using a straight-through DB-9 cable.

The various impact-sensor modules desirably are connected serially to the management controller via a 4-pin interface that includes the serial port from the management controller as well as +5.0 Vdc and ground. The impact-sensor modules are each powered by the supplied +5.0 Vdc, whereas the management controller described above runs on +3.0 Vdc.

The management controller provides power to the impact-sensor modules to which it is connected. To this end, the management controller desirably is configured to accept power from a transformer plugged into a conventional AC convenience outlet. Optionally, especially for portable applications, the management controller can be configured for operation on battery power, thereby eliminating any need for it to be located near an AC wall outlet and thus allowing it to be located virtually anywhere.

The management controller also desirably includes a built-in MP3 player that provides audio feedback. This is advantageous because MP3 files are used in many microprocessor-based systems, and a built-in MP3 player allows the ready production of MP3 audio clips. Other types of voice players alternatively can be used.

To provide maximal flexibility with respect to using the impact-sensing and measurement system in as many different applications as possible, the management controller's "behavior" can be changed as required by, for example, removing and exchanging its removable flash-memory module.

The impact-measurement system desirably is configured for recording performances in individual training sessions for any of various users in any of various sports. With such a configuration, for example, a marital arts instructor can instruct a class of students remotely through a telecommunications network. The inclusion of interactive video capability helps the instructor effectively teach martial-arts classes. The instructor is able to receive individual data for the various members of an entire class of martial arts students in real time. (Note that martial arts is mentioned here by way of example only; students in other physical disciplines can be instructed similarly.) Also, if the instructor finds that a particular student's measurement data are not at a desired level, the instructor can provide feedback to the student. Alternatively, the instructor can compare the data obtained for multiple students in multiple training sessions. In addition, a second target (or multiple targets) can be wired to the controller module, or a second impact-measurement system (or multiple such systems) can be used, wherein the controller modules of each system are interconnected using a local area network. If only a single controller module is used, the measurement data obtained from all the targets can be displayed on the same screen in a comparative manner. If two or more impact-measurement systems are used, the measurement data obtained from all the targets can be displayed on the respective displays associated with each controller module. The measurement data obtained by each impact-sensor module can be displayed on the display either individually or as any of various types of summed data.

The impact-sensor modules can be used in conjunction with any of various types of targets, such as an artificial body ("dummy") or a punching bag. If an artificial body is used, for example, then impact-sensor modules can be placed at different positions on the artificial body so as to provide different strike zones for the user, e.g., zones for head blows versus zones for body blows.

Figure 1:
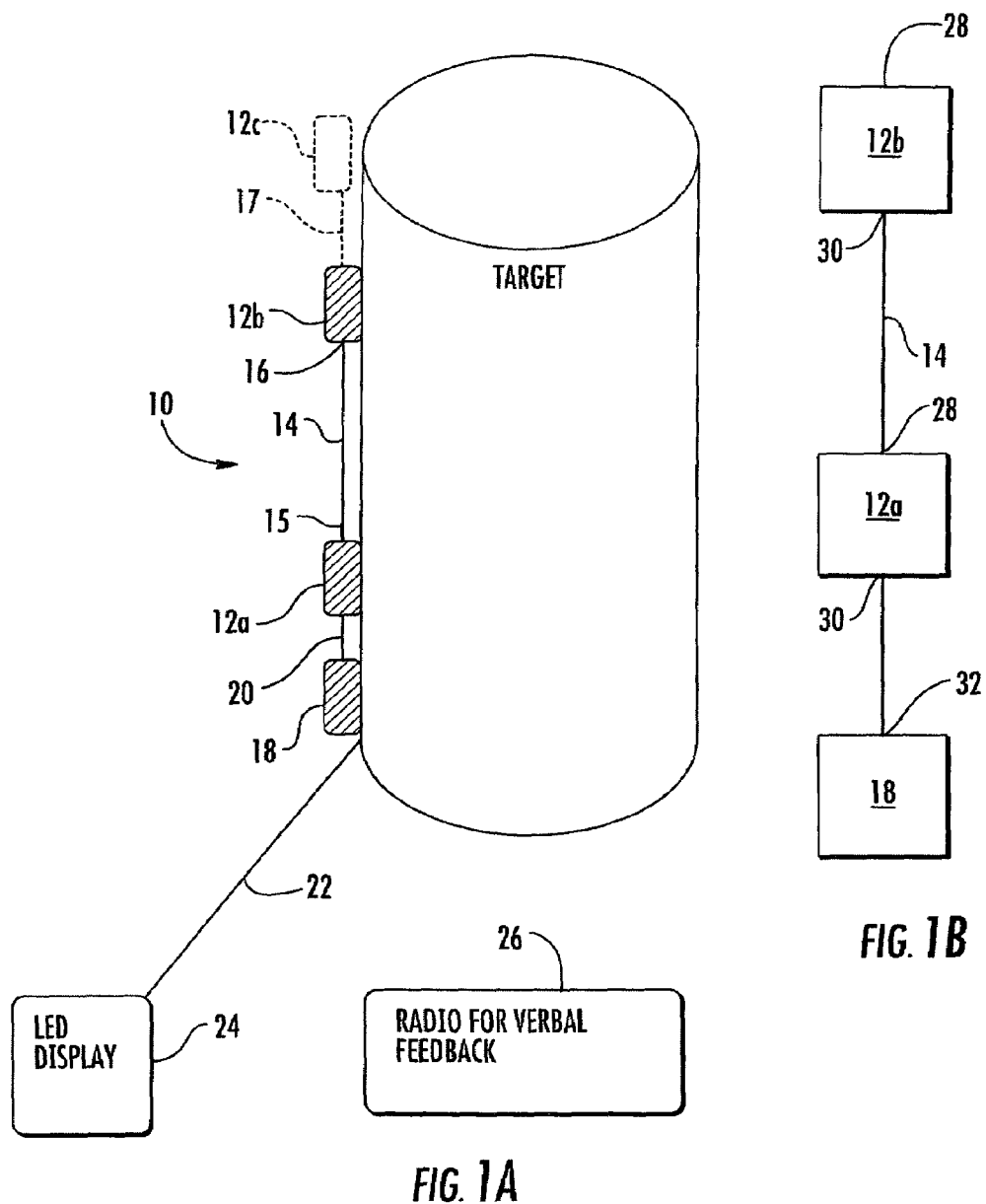
FIG. 1 is a schematic diagram of a representative embodiment of an impact-sensing and measurement system used in conjunction with an impact target.

Referring now to FIG. 1A, a representative embodiment of an impact-sensing and management system 10 is shown. The system 10 includes one or more impact-sensor modules 12 interconnected with each other in a daisy-chain manner using a connecting cable 14. A first impact-sensor module 12a is connected to one end 15 of the cable 14, and a second impact-sensor module 12b is connected to a second end 16 of the cable 14. It will be readily understood that additional impact-sensor modules, such as the impact-sensor module 12c, can be further interconnected in this daisy-chain manner using additional cables such as the connecting cable 17. The impact-sensor module 12a is connected to a management controller 18 (located desirably in the controller module) by a connecting cable 20. The management controller 18 can be connected, via either a wired or wireless connection 22, to an LED or other visual display 24. The management controller 18 also outputs audio-feedback messages to an audio-playback device, such as a headphone jack (not shown) or a playback device 26.

Referring now to FIG. 1B, each impact-sensor module 12 includes a respective input port 28 and a respective output port 30 for use in making the daisy-chain interconnections, as described above, with other impact-sensor modules. The respective input port 28 and output port 30 of each impact-sensor module 12 are interchangeable; either port is usable as an input, leaving the other port being usable as the output. The output port 30 of the impact-sensor module 12a is connected to an I/O port 32 of the management controller 18.

Figure 2:
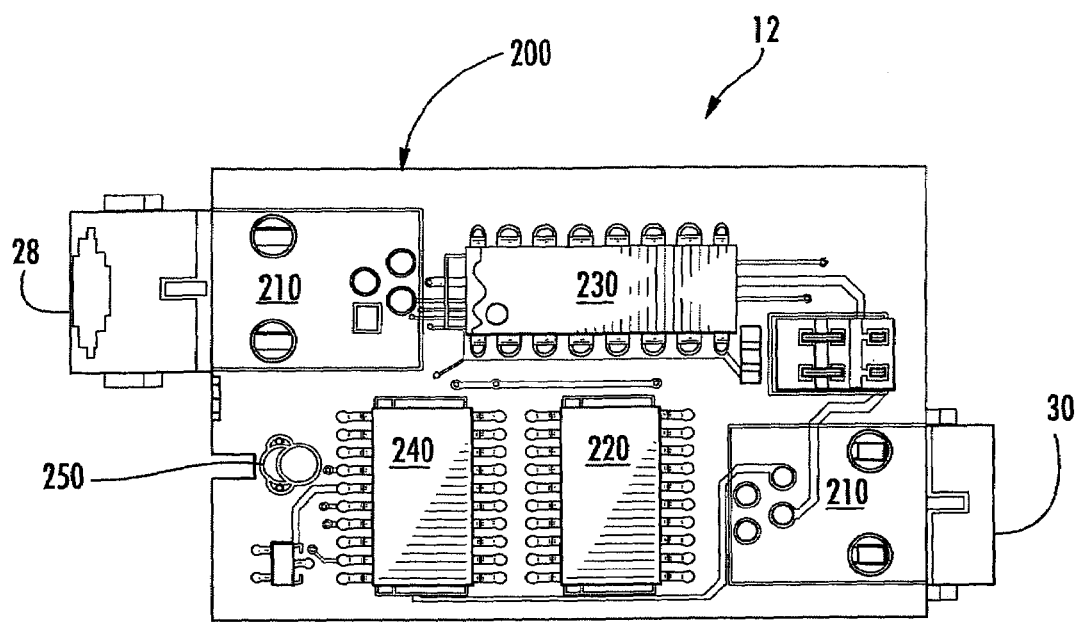
FIG. 2 is a plan view of the circuit board of an impact-sensor module as used in the impact-sensing and measurement system of FIG. 1.

Referring now to FIG. 2, an exemplary embodiment of an impact-sensor module 12 is shown. The impact-sensor module 12 comprises a respective circuit board 200 on which are mounted two identical, interchangeable connectors 210 corresponding to the input port 28 and output port 30, respectively. Since the two connectors 210 are identical, either can be used as an input port 28, with the other connector 210 being used as an output port 30. Mounted to the circuit board are a two-axis accelerometer 220 used for measuring forces applied in the x- and y-axis directions and a one-axis accelerometer 230 used for measuring accelerations in the z-axis direction. Also mounted to the circuit board 200 in this embodiment is a microprocessor 240 that includes one or more built-in Analog to Digital Converters (ADCs), a RAM, and a flash memory. Alternatively to being built into the microprocessor 240, the ADCs, RAM, and/or flash memory can be in the form of discrete components separate from the microprocessor 240.

The microprocessor 240 desirably is programmed with operating software stored thereon. The operating software enables the microprocessor 240 to respond to queries from the management controller 18 that, in this embodiment, are routed to the microprocessor via an asynchronous serial communication through the daisy-chain connection to the respective input port 28. The operating software also turns on and off a target LED 250 mounted to the circuit board 200. Exemplary wiring schematics of multiple daisy-chained impact-sensor modules 12 are shown in FIGS. 8A-8E, discussed later below.

Figure 3:
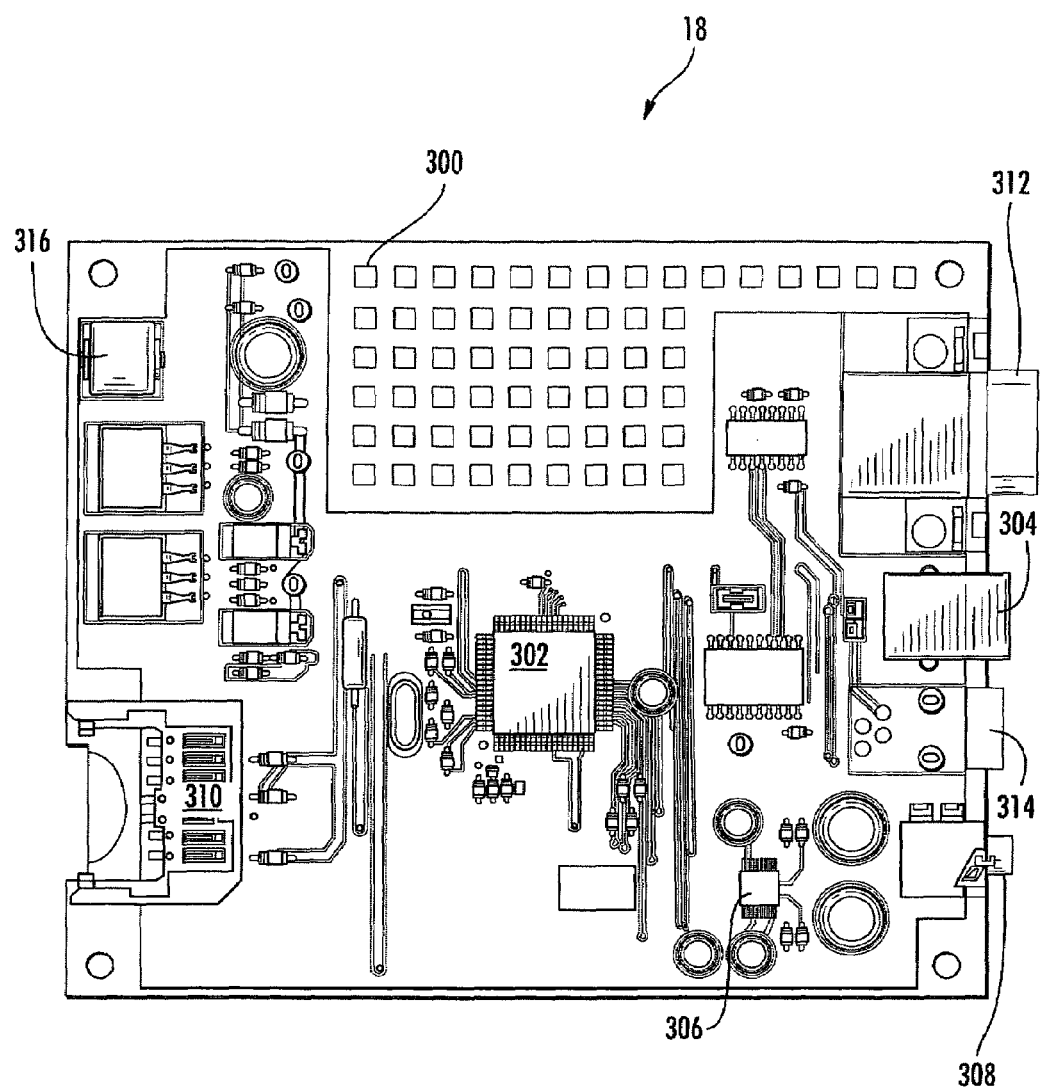
FIG. 3 is a plan view of a management-controller board as used in a controller module of the impact-sensing and measurement system of FIG. 1.

Referring now to FIG. 3, an exemplary embodiment of the management controller 18 is shown. The management controller 18 comprises a circuit board 300 to which is mounted a microprocessor 302 that desirably includes a built-in MP3 decoder, RAM, and flash memory. Alternatively to being built in, the MP3 decoder, RAM, and/or flash memory can be in the form of discrete components mounted to the circuit board 300 separately from the microprocessor 302. A USB interface connector 304 is mounted on circuit board 300 and is connected to the microprocessor 302 for inputting to the microprocessor upgrades to its operating software code. The microprocessor 302 is connected to a digital-to-audio converter 306 that desirably includes a 24-bit audio digital-to-audio converter as well as a built-in headphone amplifier. The digital-to-audio converter 306 is connected to a mini-headphone jack 308. A Multimedia Card (MMC) flash-memory device (not shown) can be connected to the management controller 18 through a multi-media connector 310. An asynchronous serial-port driver of the microprocessor 302 is connected to a female DB-9 connector 312 having a pin-out that allows the DB-9 connector 312 to be connected to a PC serial port (not shown) using a straight-through DB-9 cable (as shown, for example, in FIG. 11A). Multiple impact-sensor modules 12 are connected to the management controller 18 via a four-pin interface connector 314. An external transformer or battery supplies power to the management controller 18 through a power jack 316. Wiring schematics of an exemplary embodiment of the management controller 18 are shown in FIGS. 5-7, described later below.

Figure 4:
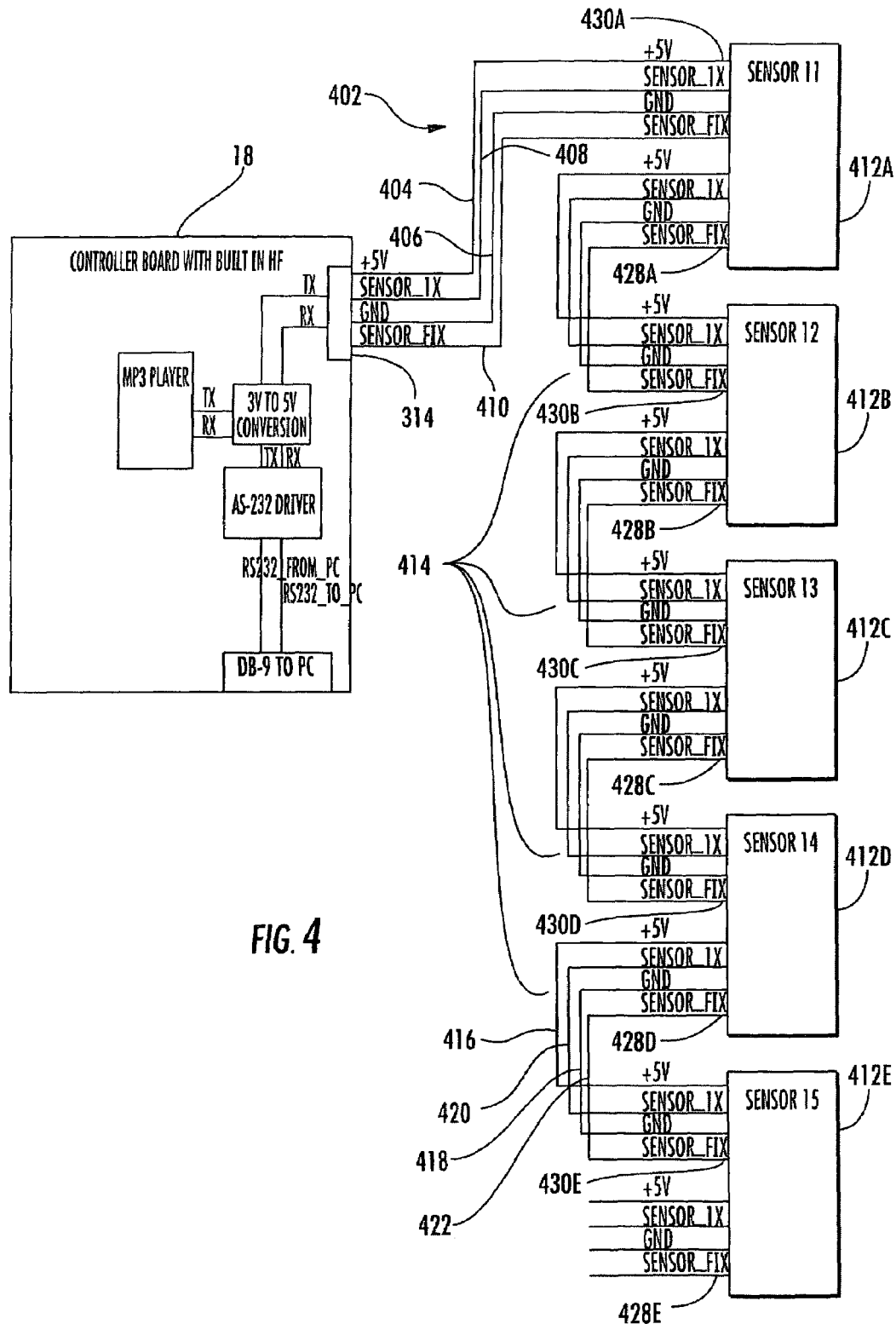
FIG. 4 is an electrical schematic diagram of an exemplary embodiment of the impact-sensing and measurement system in which multiple impact-sensor modules are "daisy-chained" together.

Referring now to FIG. 4, the management controller 18 is shown connected to five impact-sensor modules 412a-412e in a daisy-chain manner. It will be understood that the number five is exemplary only; other numbers of impact-sensor modules can be interconnected in this manner. As shown in the figure, the four-pin interface connector 314 of the management controller 18 is connected to an output port 430a of the first impact-sensor module 412a by a four-wire cable 402. The cable 402 includes a +5 Vdc conductor 404, a ground conductor 406, a sensor-transmit conductor 408, and a sensor-receive conductor 410. An input port 428a of the first impact-sensor module 412a is connected to an output port 430b of the second impact-sensor module 412b in a daisy-chain manner by a four-wire cable 414. An input port 428b of the second impact-sensor module 412b is connected to an output port 430c of the third impact-sensor module 412c in a daisy-chain manner by another four-wire cable 414. An input port 428c of the third impact-sensor module 412c is connected to an output port 430d of the fourth impact-sensor module 412d in a daisy-chain manner by yet another four-wire cable 414, and an input port 428d of the fourth impact-sensor module 412d is connected to an output port 430e of the fifth impact-sensor module 412e in a daisy-chain manner by yet another four-wire cable 414. The input port 428e of the fifth impact-sensor module 412e is open since, in this exemplary embodiment, the fifth impact-sensor module 412e is the last in the daisy chain. Similar to the cable 402, each cable 414 includes a +5 Vdc conductor 416, a ground conductor 418, a sensor-transmit conductor 420, and a sensor-receive conductor 422.

Figure 5:
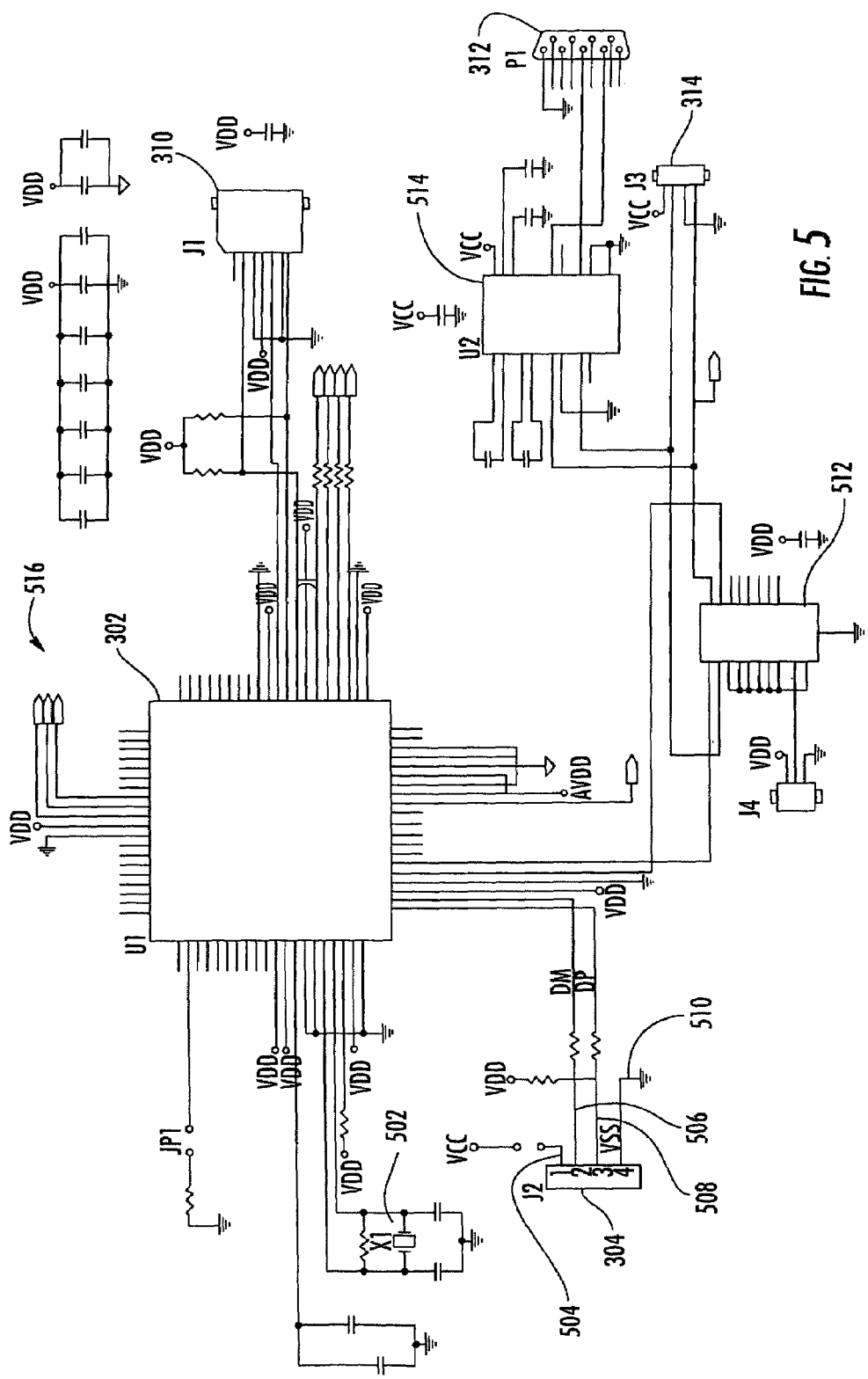
FIG. 5 is an electrical schematic diagram of an exemplary microprocessor used in the management controller.

Referring now to FIG. 5, a detailed schematic of an exemplary embodiment of the management controller 18 of FIG. 3 is shown. A 16-MHz crystal oscillator 502 is connected to the microprocessor 302. A first pin 504 of the USB interface connector 304 is connectable to a power-supply node Vcc for operation in a master mode. Second and third pins 506, 508 of the USB interface connector 304 are connected to D+ and D1 terminals, respectively, on the microprocessor 302. A fourth pin 510 of the USB interface connector 304 is connected to ground. An octal buffer/line driver 512 is connected between "transmit" and "receive" terminals of the microprocessor 302 and corresponding sensor-transmit and sensor-receive lines of the four-pin interface connector 314. A dual RS232 driver/receiver 514 is connected to the sensor-transmit and sensor-receive line connections between the octal buffer/line driver 512 and the four-pin interface connector 314, and is connected to the DB9 connector 312. The multi-media connector 310 is connected to corresponding "command," "clock," and "data" terminals of the microprocessor 302. Output conductors 516 are connected to the microprocessor 302 and are continued to FIG. 6.

Figure 6:
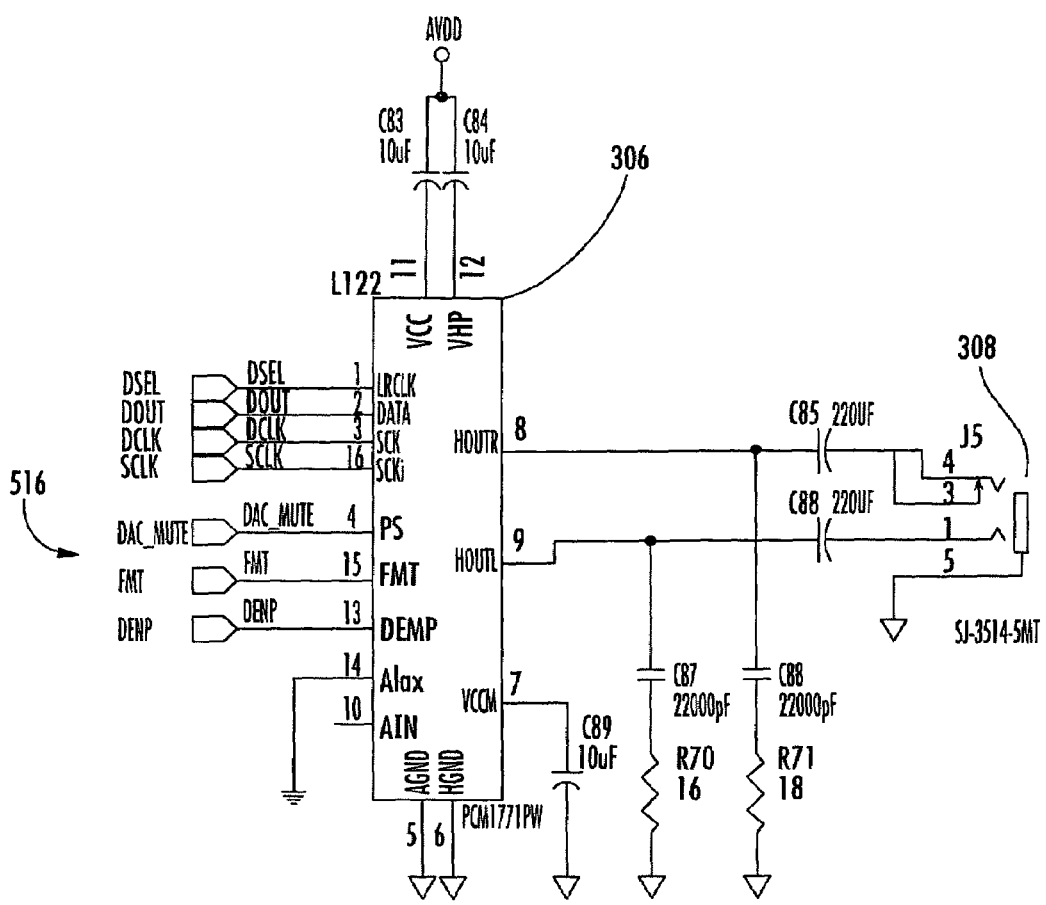
FIG. 6 is an electrical schematic diagram of exemplary analog outputs of the management controller.
Figure 7:
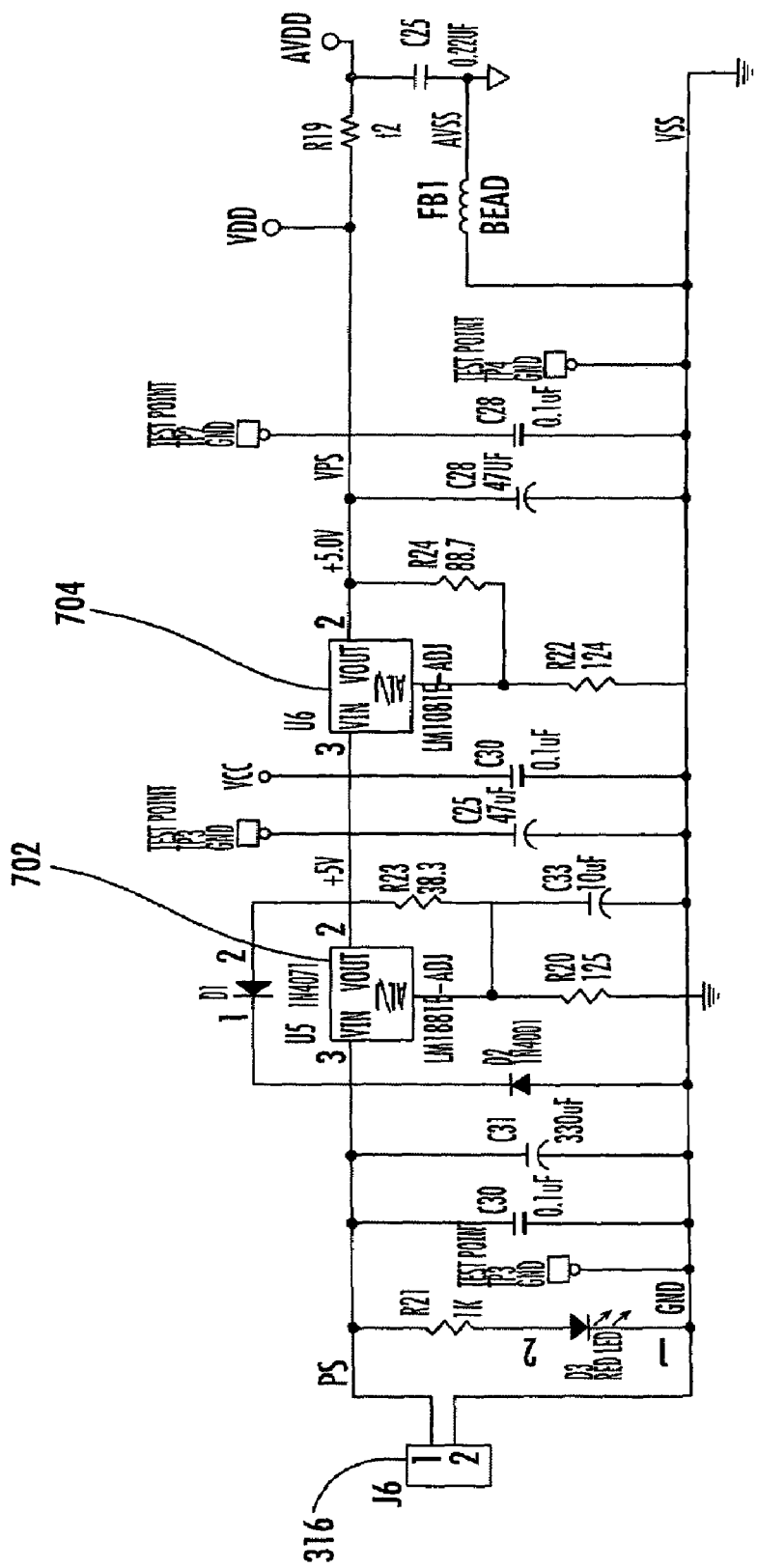
FIG. 7 is an electrical schematic diagram of an exemplary power supply as used in conjunction with the management controller.

Referring now to FIG. 6, a detailed schematic is shown of the analog-output circuit from the management controller 18. Output connectors 516 from the microprocessor 302 are connected to the digital-to-audio converter 306. The digital-to-audio converter 306 includes a 24-bit audio digital-to-audio converter and a headphone amplifier. The digital-to-audio converter 306 is connected to the mini-headphone jack 308.

Referring now to FIG. 7, a detailed schematic is shown of the power circuit of the management controller 18. The power jack 316 is connected to an input of a first voltage regulator 702. An output of the first voltage regulator 702 is connected to node Vcc and provides +5 Vdc power. The output of the first voltage regulator 702 is connected to an input of a second voltage regulator 704. An output of the second voltage regulator 704 is connected to node Vdd and provides +3 Vdc power.

Figure 8A:
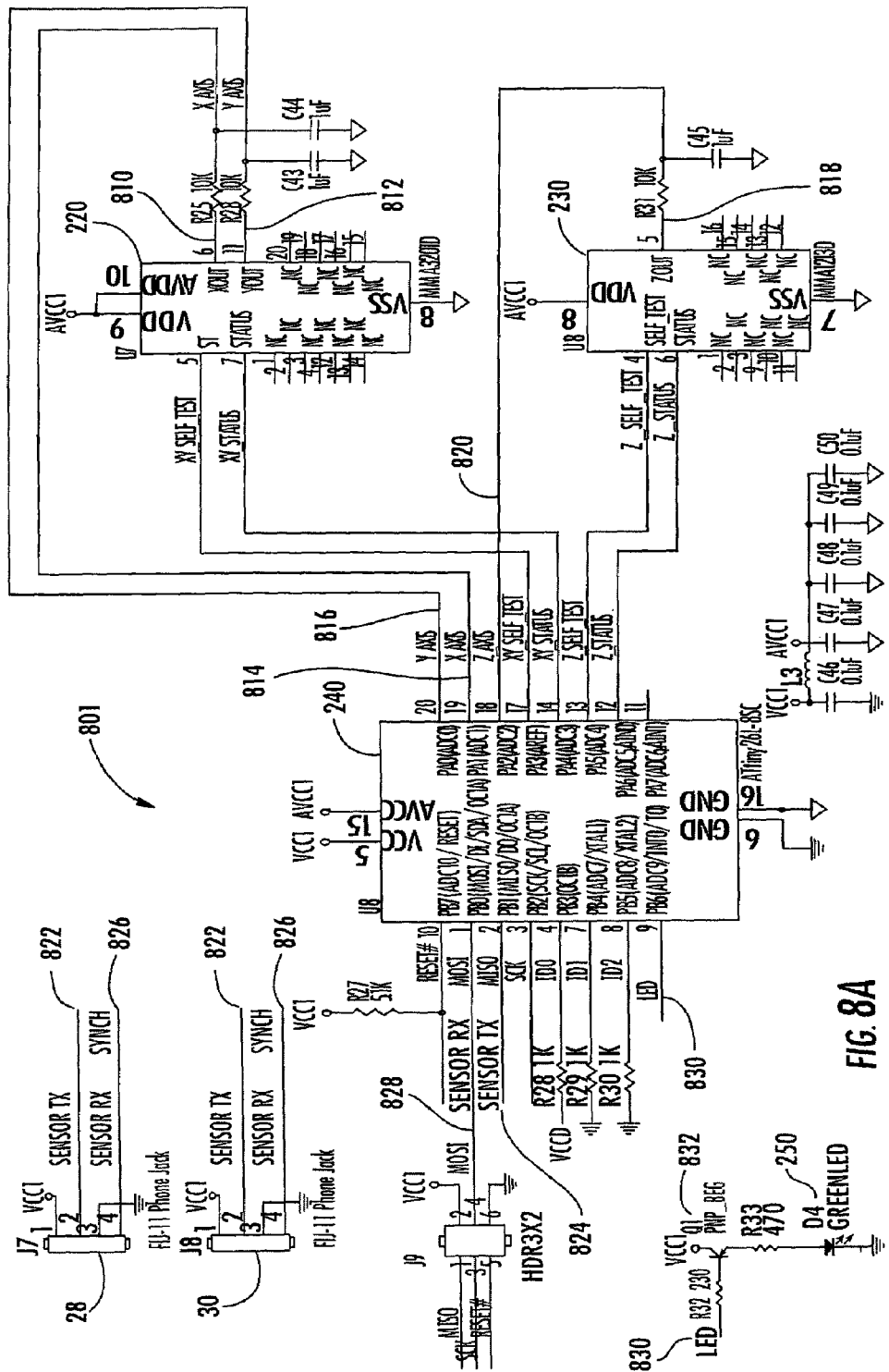
FIGS. 8A-8E are respective electrical schematic diagrams of the impact-sensor modules of FIG. 4 in a "daisy-chained" configuration.

Referring now to FIGS. 8A-8E, detailed schematics are shown of impact-sensor modules 801, 802, 803, 804, 805, respectively. Since each of FIGS. 8A-8E is substantially the same, only FIG. 8A is described in detail; the description of FIG. 8A being equally applicable to each of FIGS. 8B-8E. Specific differences between the respective figures will be described with respect to the particular figures to which the differences apply.

As shown in each of FIGS. 8A-8E generally, an x-axis output 810 and a y-axis output 812 of the 2-axis accelerometer 220 are connected to corresponding inputs 814 and 816 of the respective microprocessor 240. Similarly, a z-axis output 818 of the 1-axis accelerometer 230 is connected to a corresponding input 820 of the microprocessor 240. Each of the input port 28 and output port 30 of the impact-sensor modules 801-805 can have a sensor-transmit line connection 822 connected to a corresponding sensor-transmit terminal 824 of the microprocessor 240. Similarly, each of the input port 28 and output port 30 of the impact-sensor modules 801-805 can have a sensor-receive line connection 826 connected to a corresponding sensor-receive terminal 828 of the microprocessor 240. The respective LED 250 of each of impact-sensor modules 801-805 is connected to a corresponding LED terminal 830 of the microprocessor 240 through a transistor 832.

Figure 8B:
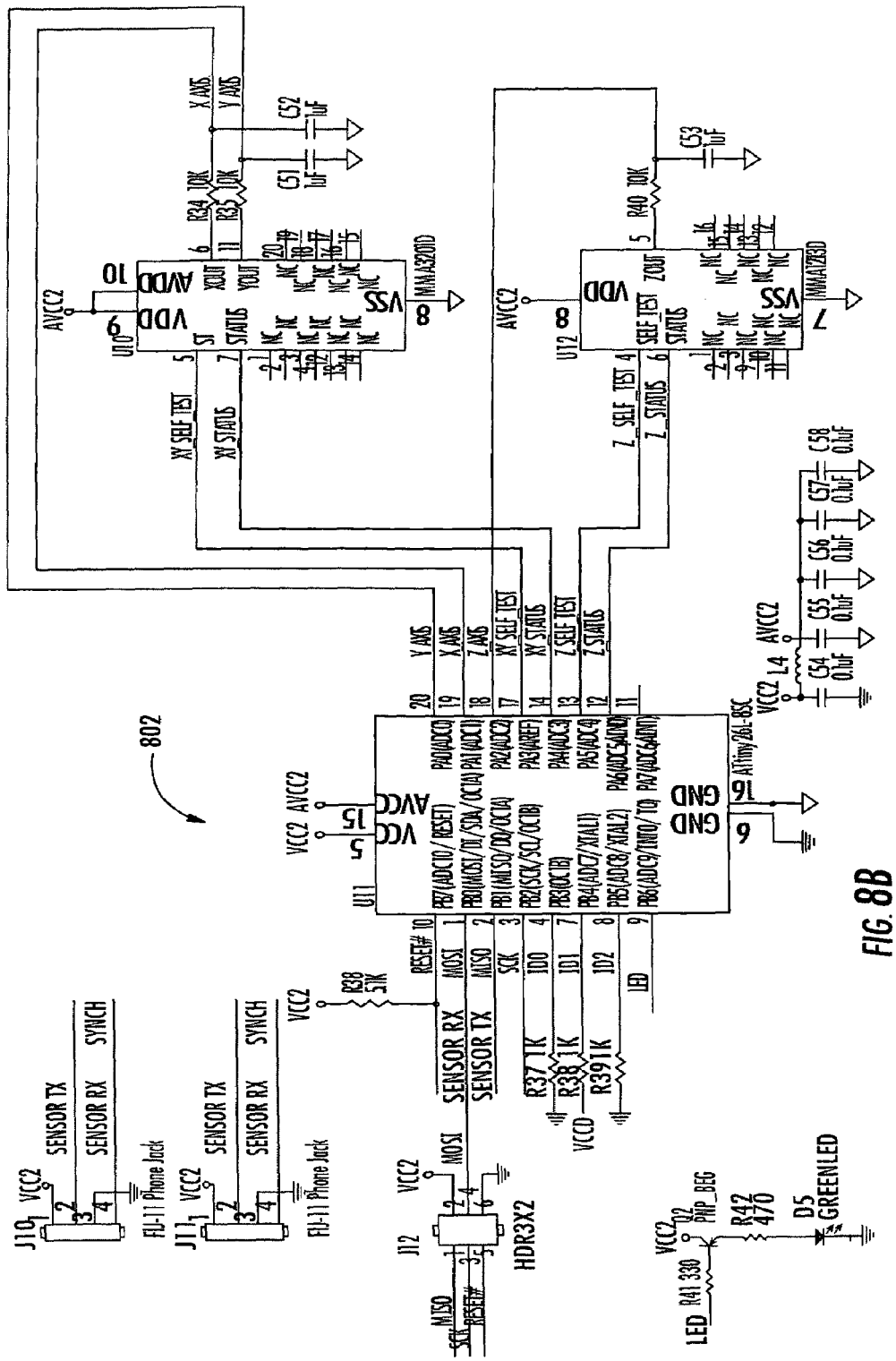
Figure 8C:
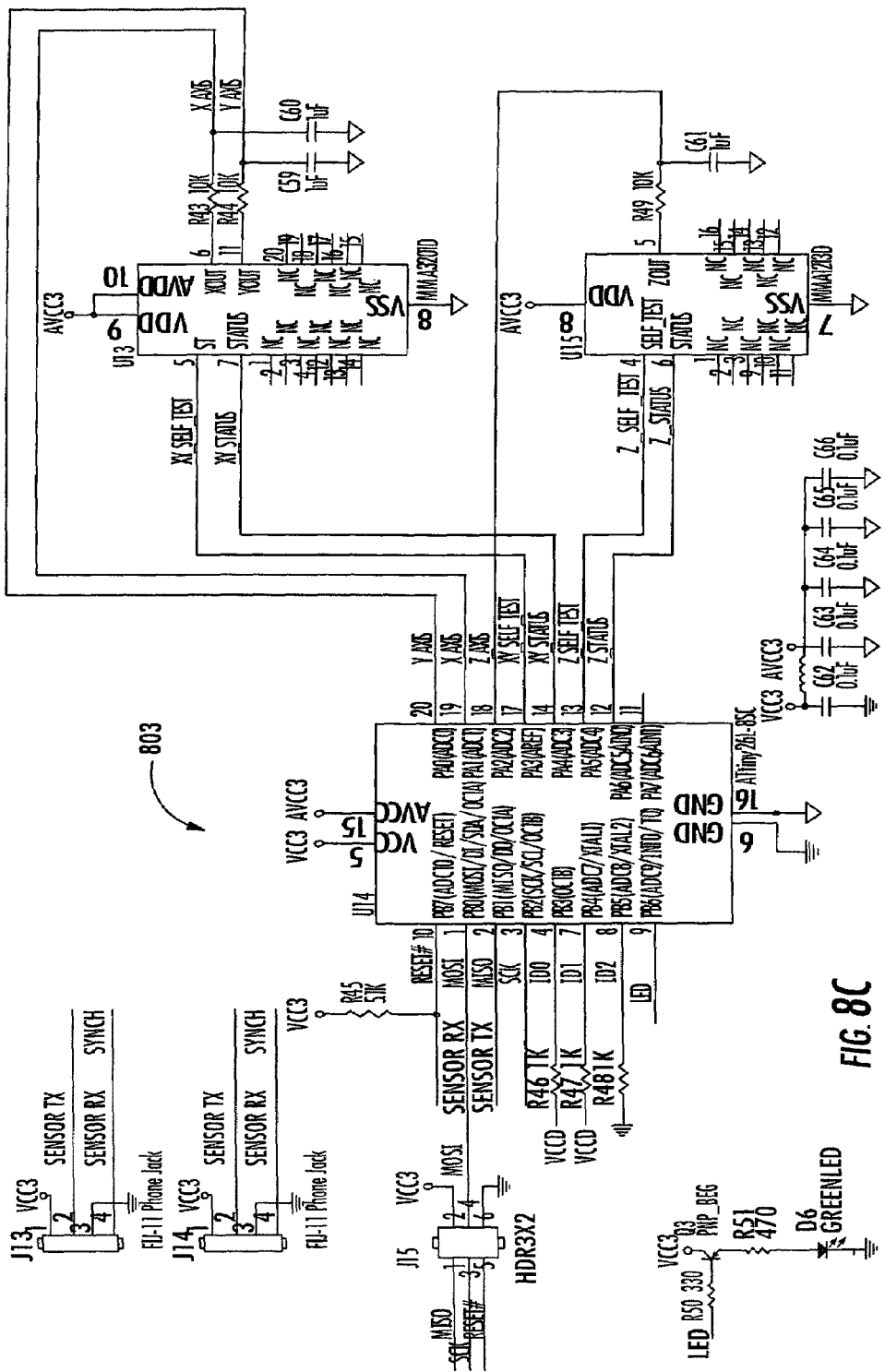
Figure 8D:
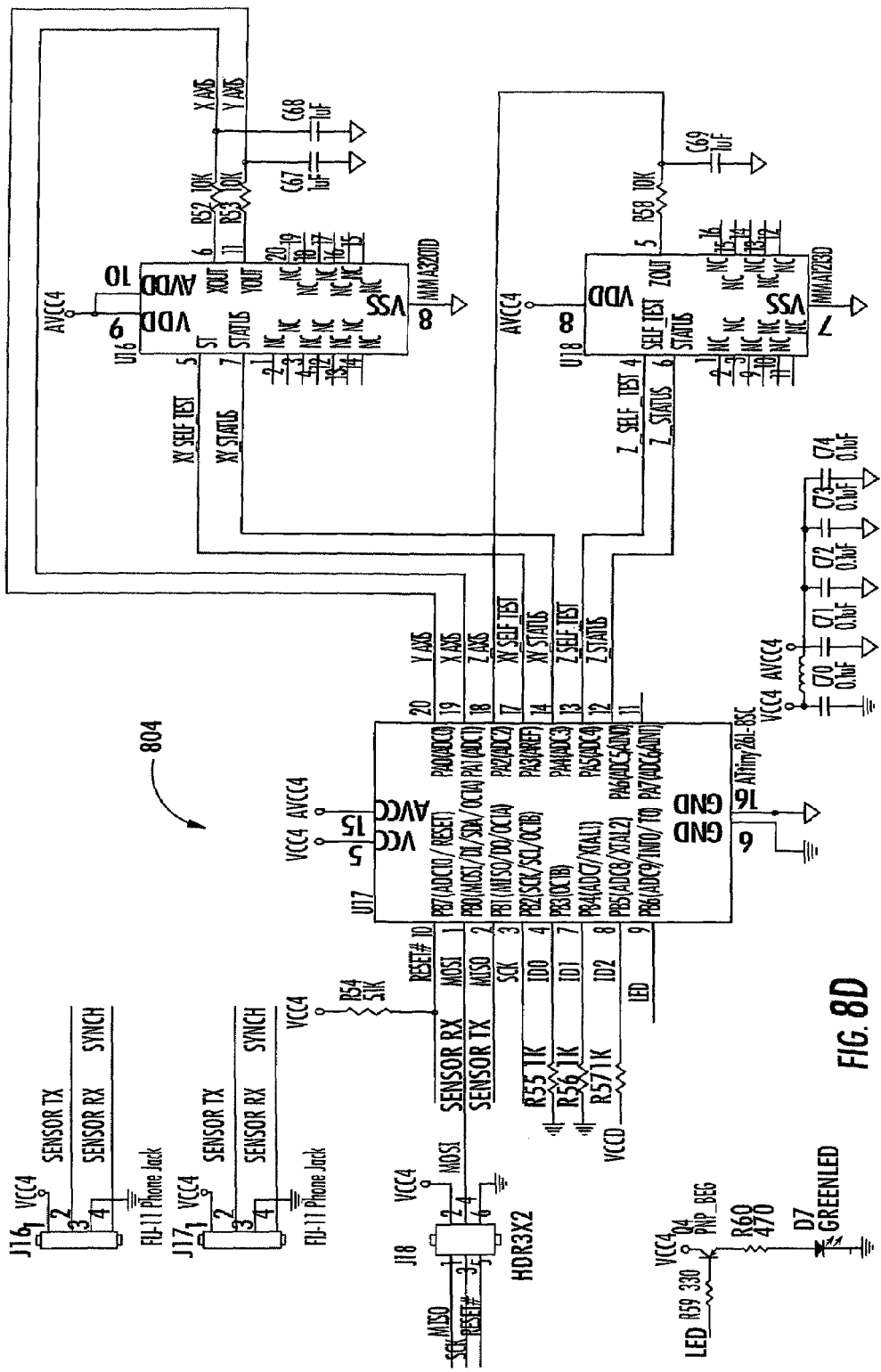
Figure 8E:
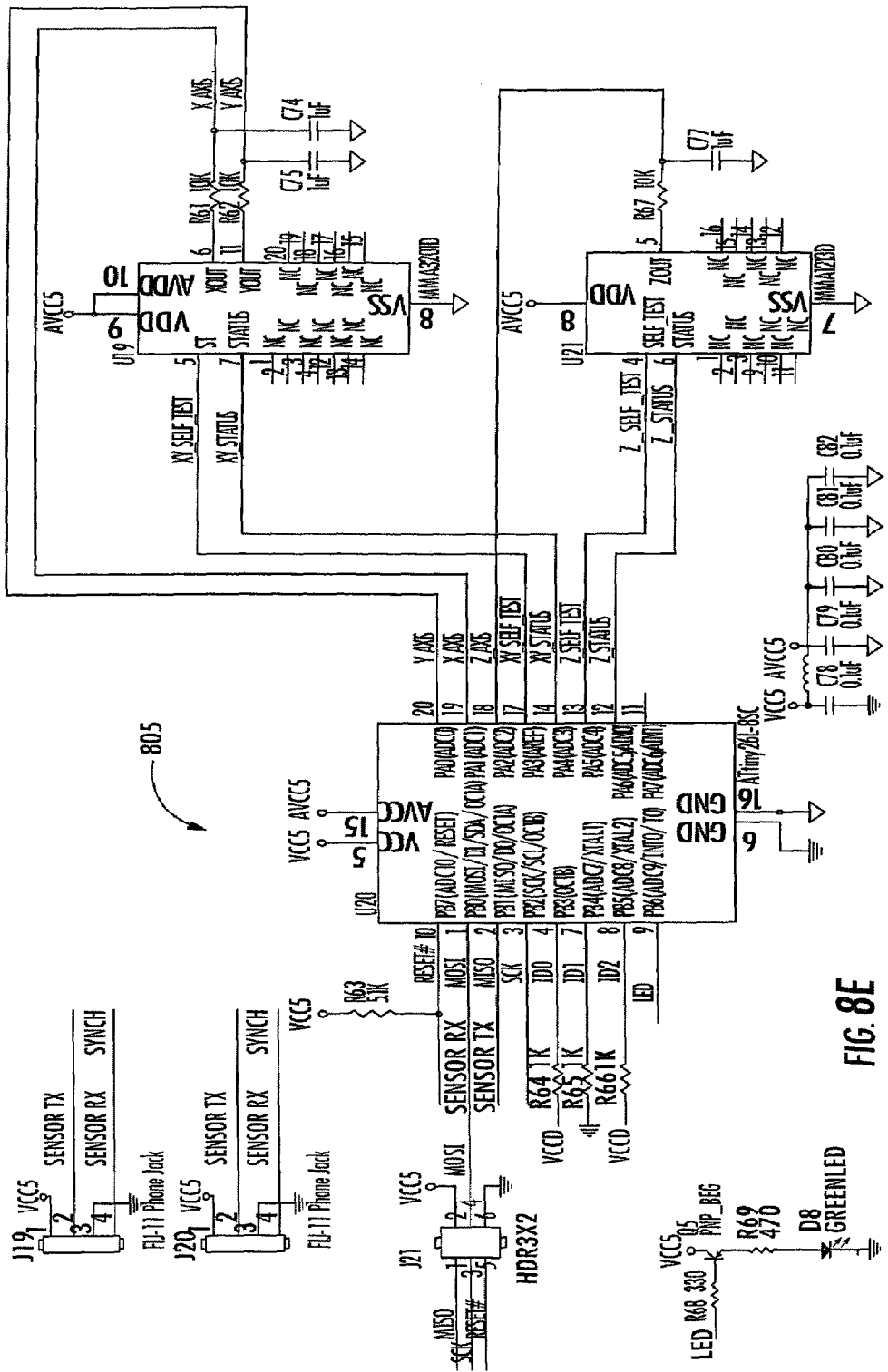

Differences between FIGS. 8A-8E pertain to the individual addressing of the respective impact sensors so that the management controller 18 can individually initiate a query and receive a response from a selected one of the impact-sensor modules 801-805. As shown in FIGS. 8A-8E, the respective microprocessors 240 of the impact-sensor modules 801-805 are sequentially assigned different binary addresses based on the pin to which Vcc is connected. As shown in FIG. 8A, a binary address value of "1" is provided to the first impact-sensor module 801 by Vcc being connected to a pin PB3. As shown in FIG. 8B, a binary address value of "2" is provided to the second impact-sensor module 802 by Vcc being connected to a pin PB4. As shown in FIG. 8C, a binary address value of "3" is provided to the third impact-sensor module 803 by Vcc being connected to each of pins PB3 (value of "1") and PB4 (value of "2"). As shown in FIG. 8D, a binary address value of "4" is provided to the fourth impact-sensor module 804 by Vcc being connected to a pin PB5. Finally, as shown in FIG. 8E, a binary address value of "5" is provided to the fifth impact-sensor module 805 by Vcc being connected to each of pins PB3 (value of "1") and PB5 (value of "4").

Figure 9:
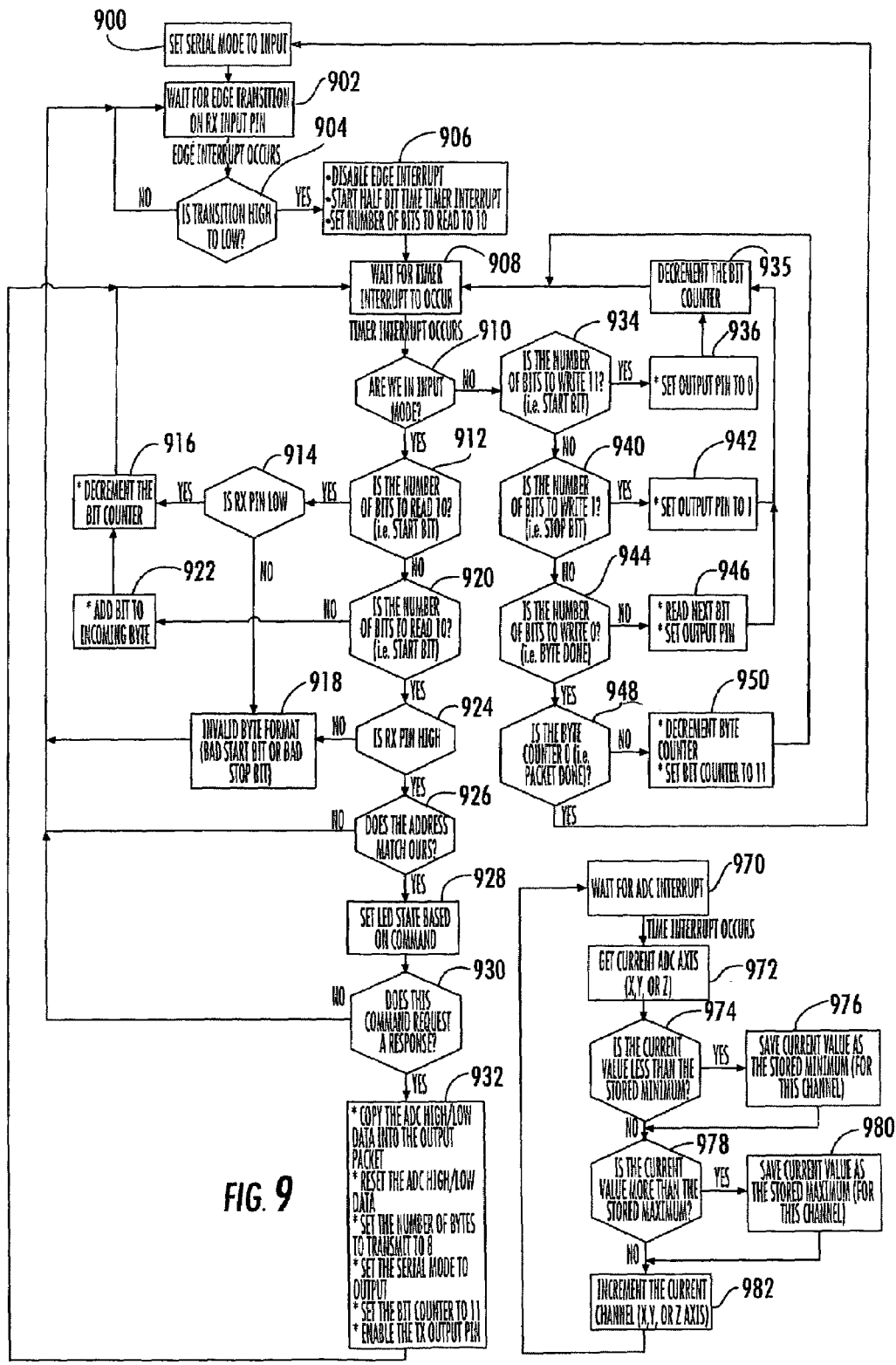
FIG. 9 is a flowchart of exemplary system software as used in an embodiment of the impact-sensing and measurement system.

Referring now to FIG. 9, a flow chart is shown outlining exemplary control software used in the microprocessor of an impact-sensor module. At step 900 an input mode is set. In step 902 the software waits for an edge transition on the receive input. Upon occurrence of the transition, a "compare" step 904 determines if the transition is from high to low. If the transition is anything other than from high to low, then step 902 is repeated. If the transition is from high to low, step 906 disables further edge interrupts, sets a half-bit-time timer interrupt, and sets the number of bits to be read to 10. Step 908 then waits for a timer interrupt to occur. Upon occurrence of the timer interrupt, step 910 determines whether the system is in an "input" mode. If so, then step 912 determines whether the number of bits to read is ten. If the number is ten, then step 914 determines if the read pin is at a low value. If it is, then step 916 decrements the bit counter and control returns to step 908. If step 914 determines that the read pin is not at a low value, then step 918 identifies an invalid byte format and returns control to step 902. If step 912 determines that the number of bits to read is a number other than ten, then step 920 determines whether the number of bits to read is zero. If the number of bits to read is a number other than zero, then step 922 adds a bit to the incoming byte and returns to step 916. If step 920 determines that the number of bits to read is zero, then step 924 determines whether the read pin is at a "high" value. If it is not, then control is transferred to step 918. If step 924 determines that the read pin is at a "high" value, then step 926 determines whether the address of the sensor matches the desired address. If the addresses do not match, then control is returned to step 902. If step 926 determines that the addresses match, then step 928 sets the LED state based on a command, and step 930 determines whether the command requires a response. If a response is not required, then control is returned to step 902. If step 930 determines that a response is required, then step 932 copies the data from the impact sensor's microprocessor into an output packet, resets the impact sensor's microprocessor, sets the byte count, sets the serial mode to output, sets the bit counter, and enables transmission of the data to the controller. Control is then returned to step 908.

However, if step 910 determines that the system was in a mode other than the "input" mode, then step 934 determines whether the number of bits to write is eleven. If the number of bits to write is eleven, then step 936 sets the output pin to "0", step 938 decrements the bit counter, and control is returned to step 908. If step 934 determines that the number of bits to write is a number other than eleven, then step 940 determines whether the number of bits to write is one, i.e., the stop bit. If the number of bits to write is one, then step 942 sets the output pin to 1 and returns control to step 938. If step 940 determines that the number of bits to write is a number other than one, then step 944 determines whether the number of bits to write is zero. If the number of bits to write is a number other than zero, then step 946 reads the next bit, sets the output pin, and returns control to step 935. If step 944 determines that the number of bits to write is zero, then step 948 determines whether the byte counter is zero, i.e., if the packet is done. If step 948 determines that the packet is done, then control is returned to step 900. If step 948 determines that the packet is not done, then step 950 decrements the byte counter, sets the bit counter to 11, and returns control to step 908.

Referring now to the software for the impact-sensor module, at step 970 an interrupt is awaited, wherein an interrupt corresponds to an impact being imparted to the sensor. Upon occurrence of the interrupt, step 972 retrieves the axis that has registered the interrupt. Step 974 determines whether the measured impact is less than a stored minimum. If the measured impact is less than the stored minimum, then step 976 stores the measured impact as the minimum. If step 974 determines that the measured impact is other than less than the stored minimum, or after step 976 saves the measured impact as the minimum, then step 978 determines whether the measured impact is greater than the stored maximum. If the measured impact is greater than the current maximum, then step 980 stores the measured impact as the maximum. If step 978 determines that the measured impact is other than greater than the stored maximum, or after step 980 saves the measured impact as the maximum, then step 982 increments to the next axis that has registered an impact and returns control to step 970.

A more complete description of an exemplary implementation of the software described in the flowchart of FIG. 9 is provided in the attached Software Appendix.

Figure 10A:
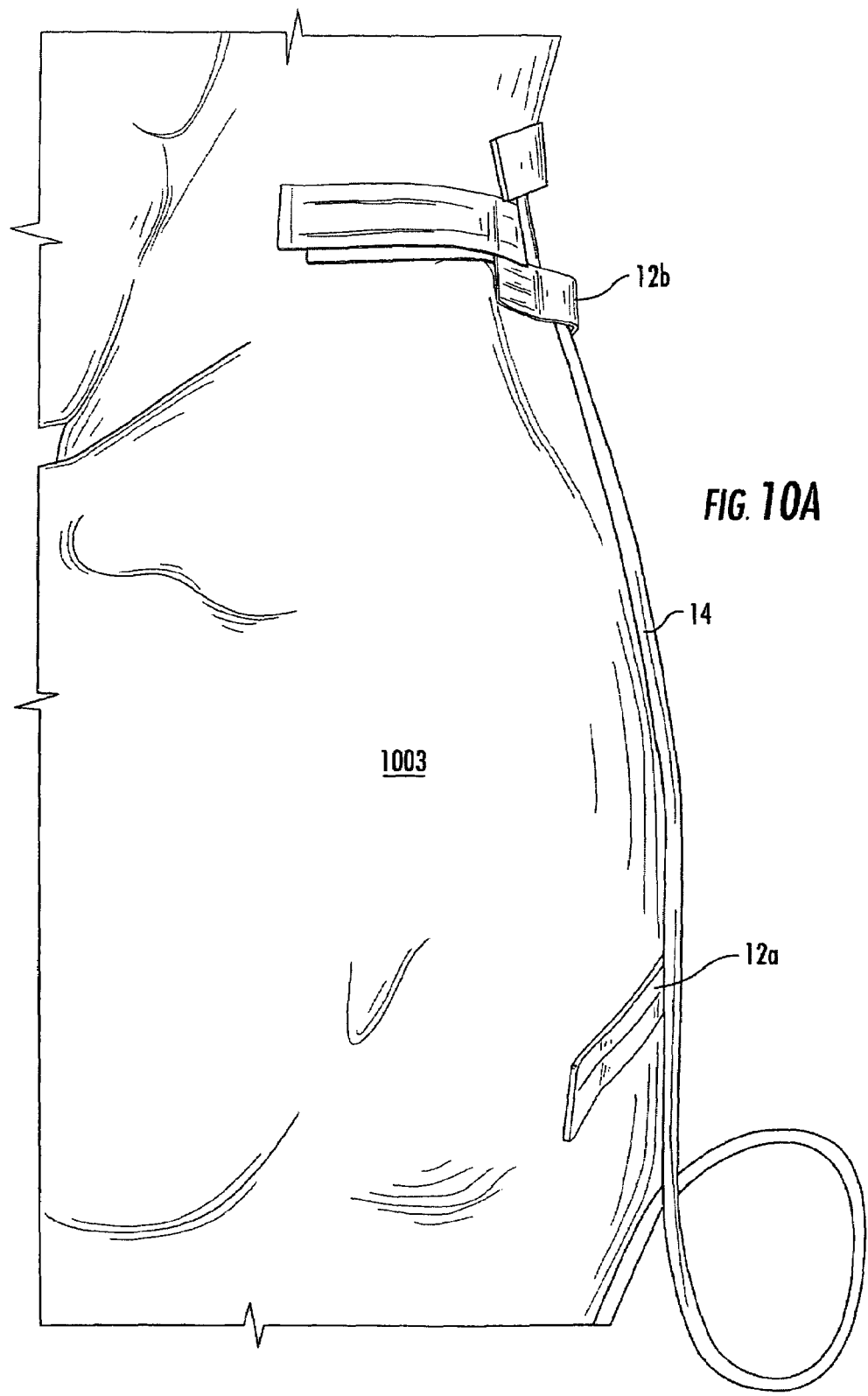
FIGS. 10A-10B depict an embodiment of the impact-sensing and measurement system mounted to a training dummy as an exemplary target.
Figure 10B:
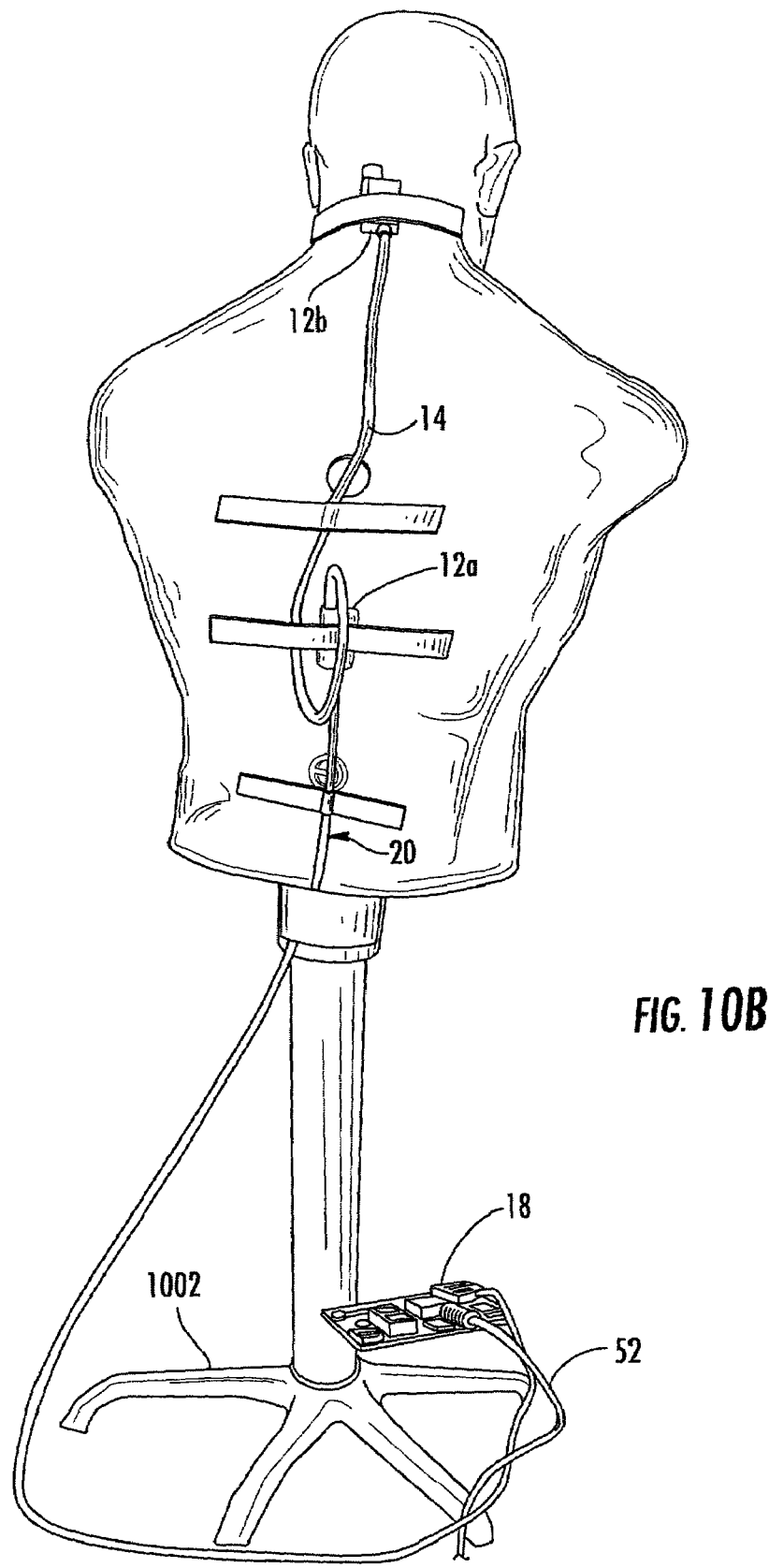

Referring now to FIGS. 10A-10B, an exemplary embodiment of the impact-sensing and management system is shown attached to the back of a training dummy 1003. As shown in FIGS. 10A-10B, a proximal impact-sensor module 12a is attached at or about the thoracic vertebra T-10, and a distal impact-sensor module 12b is attached at or about the cervical vertebra C-3. These and/or other impact-sensor modules alternatively can be attached at any of various other locations on the training dummy 1003. The impact-sensor modules 12a and 12b are daisy-chained together using the cable 14. A management controller 18 is mounted adjacent the base 1002 of the training dummy 1003 (see FIG. 1B). The management controller 18 is connected to the proximal impact-sensor module 12a by the cable 20 (see FIG. 1A). A power cord 52 is connected to the power jack 316 of the management controller 18 and plugged into an external source of ac power. One end of a serial-connector cable is connected to the DB-9 connector 312 and the other end of the cable is connected to a computer (not shown).

Figure 11A:
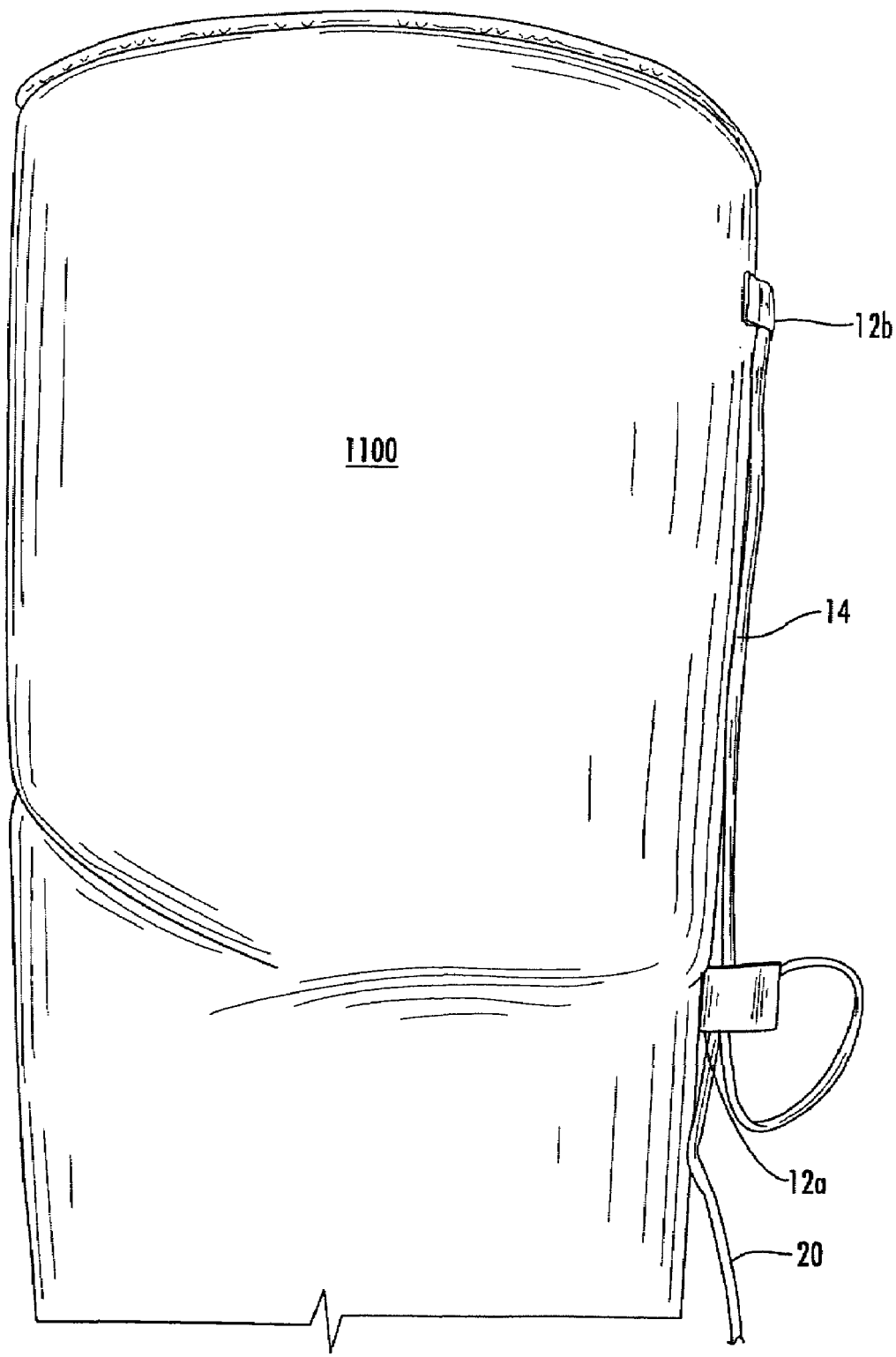
FIGS. 11A-11B depict an embodiment of the impact-sensing and measurement system mounted to a training bag as an exemplary target.
Figure 11B:
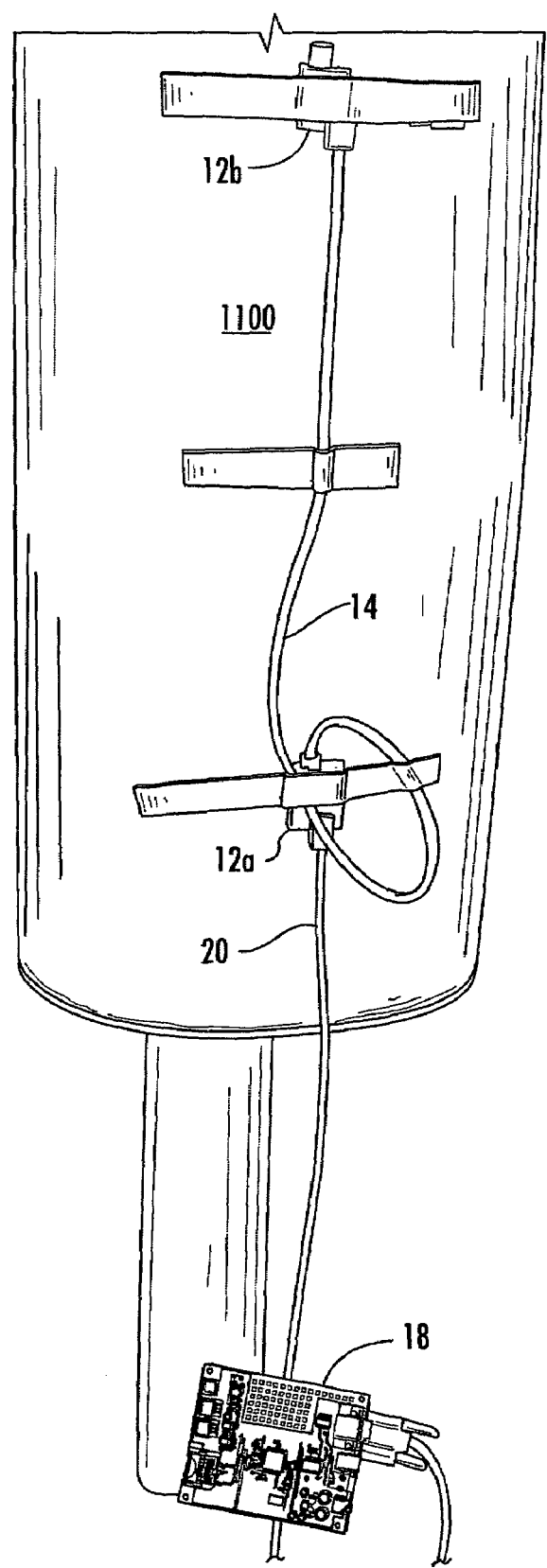

FIGS. 11A-11B are similar to FIGS. 10A-10B, respectively, except that, in FIGS. 11A-11B a different form of training dummy 1100 is used other than the human form of training dummy 1003 shown in FIGS. 10A-10B. The impact-sensing and measurement system of FIGS. 11A-11B is connected in a similar manner to that shown in FIGS. 10A-10B and thus need not be described further.

To help develop training profiles and interactive training routines, a monitoring program (not shown) can be used to log impact data and to display the data graphically. For display, a computer running a monitoring program can be connected, in place of the management controller 18, directly to the impact-sensor modules 12. The connection to a computer is made via a standard serial port as shown in FIGS. 10B and 11B. Since the computer running the monitoring program takes the place of the management controller 18, the computer similarly queries the impact-sensor modules and processes the results. The computer running the monitoring program tracks all three axes of each impact-sensor module and calculates and tracks vector-magnitude summations of the total forces applied to the impact-sensor modules over time. Each of these measurements can be shown in a different color on a graph displayed by the computer. The monitoring program allows the user to log data for a specified length of time and to perform post-analysis on the data such as zooming and measurements of the most powerful impacts and the total number of impacts greater than a specified power threshold.

Figure 12:
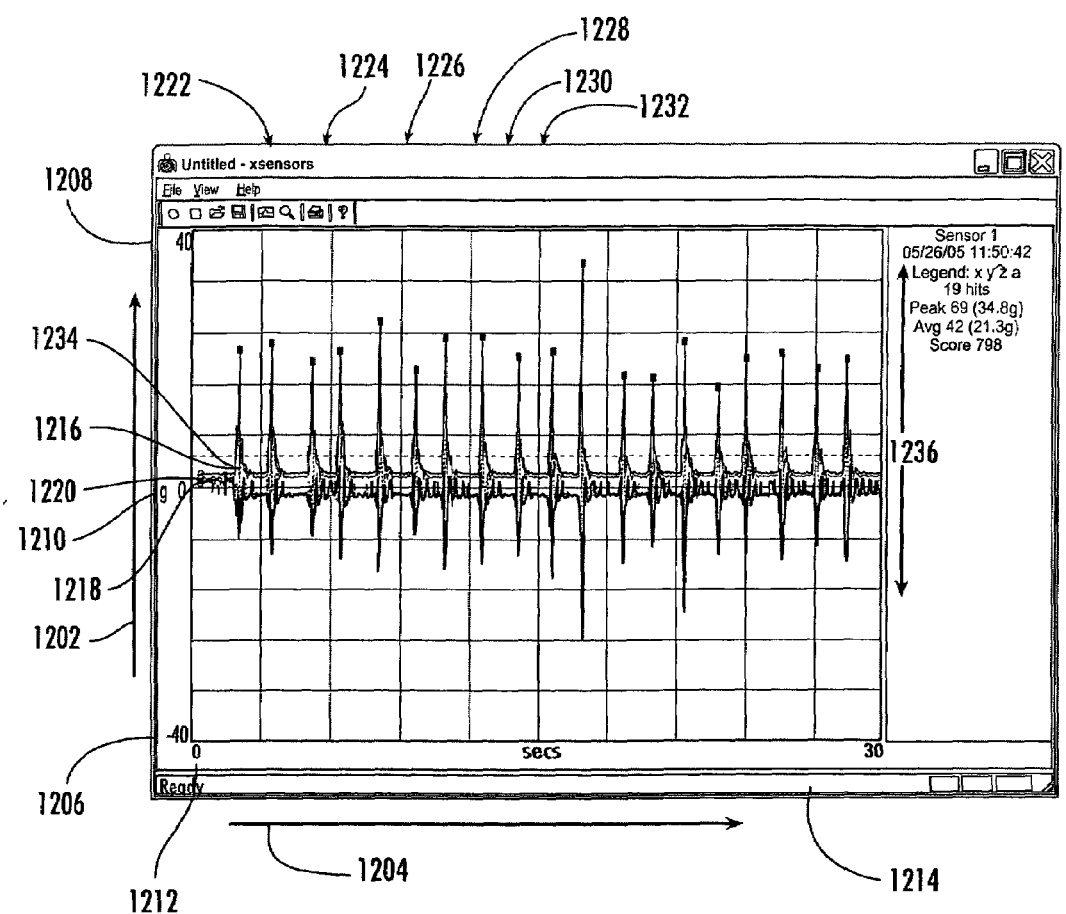
FIG. 12 is an exemplary screen display, associated with the output from a single impact-sensor module, depicting dimensional components of each of a plurality of impacts over time.

Referring now to FIG. 12, an exemplary graph, as displayed on a computer monitor, is shown. The graph pertains to acceleration 1202 versus time 1204 for each of several measured impacts of one of the impact sensors of an impact-sensing and measurement system. The vertical axis (acceleration 1202) scale ranges from −8×g 1206 to +8×g 1208 and is centered at 0×g 1210. The horizontal axis (elapsed time 1204) scale ranges from time t=0 1212 to t=26 seconds 1214. Separate plots 1216, 1218, 1220 for the x-axis accelerometer, y-axis accelerometer, and z-axis accelerometer, respectively, are displayed for each of six successive time-spaced impacts 1222, 1224, 1226, 1228, 1230, 1232. As shown in FIG. 12, from time t=0 to about time t=3.5 seconds, the plot 1216 of the x-axis accelerometer records a nominal value of about 0.5×g. During this same period of time the plot 1218 of the y-axis accelerometer records a nominal value of about 0×g, and the plot 1220 of the z-axis accelerometer records a nominal value of about 0.4×g. A fourth plot 1234 shows a vector-magnitude summation, of the total force applied to the accelerometers over this time period, of about 0.8×g. At about time t=3.6 seconds a first impact 1222 is recorded. At this instant the plots 1216, 1218, 1220 record the magnitude and time duration of the respective accelerations sensed by the x-, y-, and z-axis accelerometers, while the plot 1234 records a vector-magnitude summation, of the total force applied to the sensors, of about +5.4×g. Similar impacts are recorded at about times t=5.7 seconds, t=7.8 seconds, t=7.9 seconds, t=10.9 seconds, and t=11.1 seconds. As also shown in FIG. 12, the force recorded by each of the accelerometers following each impact exhibits some oscillatory behavior, such as oscillatory behavior 1236, as the sensor recoils from the impact.

Software Programs

XSENSOR—graphically and numerically displays each strike in real time

XTRAINER—modifies the workout techniques for Herman downloads

XTALK—allows the instructor to provide tips and feedback to students

XHISTORY—tracks workout and technique performances and provides feedback

BEST SHOT—tracks the best scores on all four parameters

BASEBALL PITCHING—sets pitching workouts and tracks performances

BASEBALL HITTING—sets workouts, translates to distance, and tracks performances

FOOTBALL PASSING—sets passing workouts and tracks performances

FOOTBALL HITTING—sets hitting workouts and tracks performances

FOOTBALL RECEIVING—sets receiving workouts and tracks performances

GOLF DRIVING—sets workouts, translates to distance, and tracks performance

GOLF SWINGS—sets workouts, translates to distance, and tracks performance

TENNIS SERVES—sets workouts, translates to mph, and tracks performance

TENNIS SWINGS—sets workouts and tracks performance

SOCCER SHOTS—sets workouts and tracks performance

HOCKEY SHOTS—sets workouts, translates to mph, and tracks performance

The invention has been described above in the context of representative embodiments that are not to be regarded as limiting in any way. It will be understood that other embodiments would be apparent to persons of ordinary skill in the relevant art without departing from the spirit and scope of the appended claims.

The invention claimed is:

1. An impact-sensing and measurement system, comprising:
    an impact-sensor module comprising at least one impact sensor and a first impact converting controller, the first impact converting controller (i) being communicable in impact data converting communication with the at least one impact sensor and (ii) communicable with an impact data storage medium;
    a controller module separate from but in impact data requesting communication with the impact-sensor module, the controller module comprising a second controller connectable in communication with the first controller, the second controller comprising a controller processor system having mountable thereon workout program software, the workout program software comprising an impact data processing component and an user selectable interactive workout program running component, wherein the interactive workout program can involve impacts sensed by the at least one impact sensor, a workout level selected by a user, and an impact technique selected by a user; and
    a feedback application connectable in communication with the second controller, the feedback application being connectable in audio or video feedback communication, or combined audio and video feedback communication, with a feedback output device, wherein the feedback application feedback communication can be derivable from (i) impact data processed by the first and second controllers; and (ii) the interactive workout program.

2. The system of claim 1, wherein the controller module comprises the feedback application.

3. The system of claim 1, wherein the impact-sensor module further comprises at least one display element communicable with the second controller.

4. The system of claim 3, wherein the display element can exhibits a display whenever a force associated with an impact sensed by the at least one impact sensor exceeds a force threshold.

5. The system of claim 4, wherein the display element comprises an LED that illuminates whenever the force exceeds the force threshold.

6. The system of claim 1, wherein the first controller comprises:
    multiple inputs including a respective impact-sensor input for each impact sensors connected to the first controller;
    a respective analog-to-digital converter for each impact-sensor input;
    a storage memory system for stored data and stored code usable for operating the first controller; and
    a display whereby the display may be triggered when at least one impact sensors senses an impact having a force exceeding a threshold.

7. The system of claim 1, wherein the feedback application can provide feedback concerning a parameter associated with one or more impacts sensed by the at least one impact sensor, and wherein the feedback application can communicate suggested workout events via the feedback output device.

8. The system of claim 7, wherein the feedback output device comprises a visual display.

9. The system of claim 7, wherein the feedback output device comprises an audio device.

10. The system of claim 9, wherein the audio device comprises an audio-playback device.

11. The system of claim 9, wherein the feedback output device further comprises a visual display.

12. The system of claim 1, wherein the interactive workout program comprises a learning control based on stored impact data values.

13. The system of claim 1, wherein the at least one impact sensor further comprises an impact sensor data memory, and wherein the second controller is communicable with the first controller to recall data from the memory.

14. The system of claim 1, wherein the at least one impact sensor comprises at least one accelerometer capable of sensing an acceleration in at least one spatial dimension.

15. The system of claim 1, wherein the at least one impact sensor comprises either a single accelerometer configured to sense an acceleration along multiple spatial axes or multiple accelerometers each being configured to sense an acceleration along at least one respective spatial axis.

16. The system of claim 15, wherein the at least one impact sensor comprises a first accelerometer configured and orientatable to sense components of the acceleration along two spatial dimensions and a second accelerometer configured and orientatable to sense a component of the acceleration along a third spatial dimension.

17. The system of claim 16, wherein the second controller is configured to calculate, from a sensed acceleration, an absolute force applied to the impact sensor.

18. The system of claim 1, wherein the at least one impact sensor is spatially orientatable and configured to sense accelerations along multiple spatial axes.

19. The system of claim 1, wherein the second controller is communicable with the first controller via a wire.

20. The system of claim 1, wherein the second controller is wirelessly communicable with the first controller.

21. The system of claim 1, wherein the first controller comprises a processor system configured to produce output signals corresponding to impact data obtained by the at least one impact sensor and measured by the first controller processor system.

22. The system of claim 21, wherein the at least one impact sensor is configured to sense an acceleration along multiple spatial axes, and wherein the output signals are analog signals respectively proportional to the measured impact data in each of the multiple axes.

23. The system of claim 21, wherein the at least one impact sensor is configured to sense an acceleration along multiple spatial axes, and wherein the output signals are digital signals corresponding to the measured impact data in each of the multiple axes.

24. The system of claim 1, wherein the second controller further comprises a storage medium communicable with the second controller processor system and capable of storing a profile of the user, and wherein the interactive workout program can involve a stored profile of the user.

25. The system of claim 24, wherein the storage medium comprises a RAM, a flash memory, or a combination thereof.

26. The system of claim 1, wherein:
the at least one impact sensor comprises multiple impact sensors;
the multiple impact sensors are communicable with the first controller, and
the second controller is communicable with the first controller to evaluate respective impact data produced by the multiple impact sensors.

27. The system of claim 26, further comprising a target to which the multiple impact sensors are mounted, the target being configured to receive an impact, as sensed by the impact sensors, from a user.

28. The system of claim 26, further comprising an implement used in a contact sport, wherein the multiple impact sensors are attached to the implement so as to measure an impact produced by striking the implement.

29. The system of claim 1, wherein the at least one impact sensor comprises multiple impact sensors connected to the first controller in a daisy-chained manner.

30. The system of claim 29, wherein each impact sensor comprises a respective input connector and a respective output connector that are functionally interchangeable with each other.

31. The system of claim 1, wherein the second controller communicates with the first controller according to a packet-based protocol.

32. The system of claim 31, wherein the second controller is operable to request data from the first controller and the first controller responds to the request by delivering impact data to the second controller.

33. The system of claim 1, further comprising a computer communicable with at least one of the first and second controllers.

34. The system of claim 33, wherein:
the computer comprises a display; and
at least one of the first and second controllers is further configured to output a video signal to the computer for display of impact data on the display of the computer.

35. The system of claim 33, wherein the computer is connected to a network and is configured to communicate via the network with a second computer also connected to the network.

36. The system of claim 35, wherein the computers are programmed to provide a user of the system with an interactive workout involving impacts sensed by the at least one impact sensor, wherein data from the impacts are processed by both computers over the network.

37. The system of claim 33, wherein the computer is programmed to provide a user of the system with an interactive workout involving impacts sensed by the at least one impact sensor, wherein data from the impacts are processed by the computer.

38. The system of claim 1, further comprising a playback device communicable with at least one of the first and second controllers, the playback device being configured to store a workout program for a user of the system and to play back the program on demand, wherein the workout program can involve impacts delivered by the user and measurements of the impacts by the at least one impact sensor.

39. The system of claim 1, wherein the interactive workout program is selectable from a plurality of interactive workout programs by a user of the system.

40. A personal training system, comprising:
at least one impact sensor having one of a plurality of impact threshold values, the at least one impact sensor comprising an onboard first processor system having an analog-to-digital converter and a first memory communicable with the analog-to-digital converter to receive impact data; and a management controller module separate from the at least one impact sensor but transmittingly and receivingly communicable with the at least one impact sensor, the management controller module comprising:
(i) a second memory;
(ii) a user information database capable of containing a user profile for at least one user;
(iii) a second processor system communicable with the second memory, the second processor system communicable with the first memory to request impact data and communicable with the second memory to execute at least one interactive workout program stored in the second memory;
(iv) a user interface operable by a user of the system to access (1) the user information database; (2) select the at least one interactive workout program to be executed by the second processor system; and (3) select the impact threshold value of the at least one impact sensor from the plurality of impact threshold values; and
(v) a feedback application capable of being in audio or video feedback communication, or combined audio and video feedback communication, with a feedback output device, wherein the feedback communication can be derivable from impact data requested by the management controller and received from the first memory of the at least one impact sensor.

41. The personal training system of claim 39, wherein the at least one interactive workout program is a plurality of interactive workout programs, and wherein the user interface is operable by a user of the system to select an interactive workout program form the plurality of interactive workout programs.

42. A method for sensing and measuring impacts, comprising:

providing an electronic personal training system comprising (i) at least one impact sensor having a first memory and a processor system, (ii) at least one controller having a second memory and being separate from but in communication with the at least one impact sensor, and (iii) at least one user interface;

storing at least one interactive workout program in the second memory of the at least one controller;

inputting user information via the at least one user interface and storing the user information in the second memory;

selecting and executing the at least one interactive workout program, wherein the at least one interactive workout program accesses the user information stored in the second memory;

detecting an impact on the at least one impact sensor and operating the microprocessor to convert the detected impact into impact data;

storing the impact data in the first memory of the at least one impact sensor;

requesting the impact data stored in the first memory be sent from the at least one impact sensor to the at least one controller;

upon receiving the request, transmitting the impact data stored in the first memory to the at least one controller; and providing feedback based at least partially on the impact data and the user information.

* * * * *

UNITED STATES PATENT AND TRADEMARK OFFICE
CERTIFICATE OF CORRECTION

PATENT NO. : 7,308,818 B2
APPLICATION NO. : 11/055780
DATED : December 18, 2007
INVENTOR(S) : Gary Considine et al.

It is certified that error appears in the above-identified patent and that said Letters Patent is hereby corrected as shown below:

Title Page; item (75);
In the "Inventors" section on page 1, "Rita Server" should read --Rita Sever--.

Column 21, Line 40, "marital" should read --martial--.

Column 27, Line 38, "Software Programs" should read --SOFTWARE PROGRAMS--.

Column 28, Line 28, "an" should read --a--.

Signed and Sealed this

Thirteenth Day of May, 2008

JON W. DUDAS
*Director of the United States Patent and Trademark Office*